(12) United States Patent
Imai

(10) Patent No.: US 10,951,510 B2
(45) Date of Patent: Mar. 16, 2021

(54) COMMUNICATION DEVICE AND COMMUNICATION METHOD

(71) Applicant: FUJITSU LIMITED, Kawasaki (JP)

(72) Inventor: Satoshi Imai, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 0 days.

(21) Appl. No.: 16/424,635

(22) Filed: May 29, 2019

(65) Prior Publication Data

US 2019/0372882 A1 Dec. 5, 2019

(30) Foreign Application Priority Data

Jun. 5, 2018 (JP) .............................. JP2018-107598

(51) Int. Cl.
  *H04L 12/755* (2013.01)
  *H04L 12/24* (2006.01)
  (Continued)

(52) U.S. Cl.
  CPC ............ *H04L 45/021* (2013.01); *H04L 41/12* (2013.01); *H04L 45/08* (2013.01); *H04L 67/10* (2013.01)

(58) Field of Classification Search
  CPC ....... H04L 41/12; H04L 45/021; H04L 45/08; H04L 63/101; H04L 67/10; H04L 67/1078; H04L 67/1089; H04L 67/2809; H04L 67/2871; H04L 67/288; G06F 11/1446; G06F 16/113; G06F 2201/80; G06F 2201/84; G06F 3/0605; G06F 3/0646; G06F 3/067
  See application file for complete search history.

(56) References Cited

U.S. PATENT DOCUMENTS 7,644,150 B1 * 1/2010 Nucci ..................... H04L 41/16
                                                 709/223
10,581,847 B1 * 3/2020 Sun ....................... H04L 9/3239
(Continued)

FOREIGN PATENT DOCUMENTS

EP    2572495       3/2013
JP    2003-179597   6/2003
(Continued)

OTHER PUBLICATIONS

EESR—Extended European Search Report dated Sep. 13, 2019 for corresponding European Patent Application No. 19177257.3.
(Continued)

*Primary Examiner* — Backhean Tiv
(74) *Attorney, Agent, or Firm* — Fujitsu Patent Center

(57) ABSTRACT

A communication device belonging to a first cluster among a plurality of clusters includes a memory, a processor, and a network connection device. The memory stores identification information of another cluster that has information being retrievable by a terminal connecting to the communication device in a summary of data held by the other cluster. The processor performs, upon receiving a combination of identification information of a second cluster that holds retrieval-target data and identification information of the retrieval-target data from the terminal that accessed the summary, a control to request target data identified by the combination. The network connection device forwards the target data to the terminal.

7 Claims, 16 Drawing Sheets

(51) Int. Cl.
*H04L 12/751* (2013.01)
*H04L 29/08* (2006.01)

(56) References Cited

U.S. PATENT DOCUMENTS

| | | | | |
|---|---|---|---|---|
| 10,742,313 | B1* | 8/2020 | Favarolo | H04L 9/3236 |
| 2002/0073105 | A1* | 6/2002 | Noguchi | G06F 16/10 |
| 2008/0288365 | A1* | 11/2008 | Fisher, III | G06Q 20/1235 |
| | | | | 705/26.8 |
| 2010/0312851 | A1* | 12/2010 | Jackson | H04L 41/50 |
| | | | | 709/217 |
| 2011/0055328 | A1* | 3/2011 | Lahr | H04L 67/1002 |
| | | | | 709/204 |
| 2012/0191778 | A1* | 7/2012 | Kim | H04L 67/1061 |
| | | | | 709/204 |
| 2015/0373455 | A1* | 12/2015 | Donaldson | G10L 25/87 |
| | | | | 381/79 |
| 2016/0014482 | A1* | 1/2016 | Chen | H04N 21/26258 |
| | | | | 386/241 |
| 2017/0011053 | A1* | 1/2017 | Hubbard | H04L 67/32 |
| 2017/0286717 | A1* | 10/2017 | Khi | G06F 21/6245 |
| 2017/0316078 | A1* | 11/2017 | Funke | G06F 16/283 |
| 2018/0046766 | A1* | 2/2018 | Deonarine | H04L 9/0643 |
| 2018/0068008 | A1* | 3/2018 | Cruanes | G06F 16/211 |
| 2018/0167290 | A1* | 6/2018 | Hasegawa | H04L 43/045 |
| 2018/0255381 | A1* | 9/2018 | Cella | G05B 23/0221 |
| 2018/0315145 | A1* | 11/2018 | Darnell | G06Q 50/205 |
| 2018/0337847 | A1* | 11/2018 | Li | H04L 67/1029 |
| 2018/0337882 | A1* | 11/2018 | Li | H04L 61/35 |
| 2018/0375840 | A1* | 12/2018 | Moy | H04L 69/22 |
| 2019/0013948 | A1* | 1/2019 | Mercuri | H04L 9/3239 |
| 2019/0108499 | A1* | 4/2019 | Liu | G06Q 30/0242 |
| 2019/0147078 | A1* | 5/2019 | Dageville | G06F 16/2358 |
| | | | | 707/695 |
| 2019/0149418 | A1* | 5/2019 | Bertsche | G06F 9/445 |
| | | | | 707/625 |
| 2019/0166101 | A1* | 5/2019 | Ramos | H04L 9/0827 |
| 2019/0188046 | A1* | 6/2019 | Florissi | H04L 63/0209 |
| 2019/0207759 | A1* | 7/2019 | Chan | H04L 9/30 |
| 2019/0236606 | A1* | 8/2019 | Padmanabhan | G06Q 20/401 |
| 2019/0268139 | A1* | 8/2019 | Kurian | H04L 9/3239 |
| 2019/0372882 | A1* | 12/2019 | Imai | H04L 67/10 |

FOREIGN PATENT DOCUMENTS

| | | |
|---|---|---|
| JP | 2006-190205 | 7/2006 |
| WO | 2011/144245 A1 | 11/2011 |

OTHER PUBLICATIONS

M. Sadish Sendil et al.,"Improving the performance of P2P networks using SPIS with Query Filtering", Journal of High Speed Networks, IOS Press, Amsterdam, NL, vol. 18, No. 2, Jan. 1, 2011, pp. 131-140, XP009515836, ISSN: 0926-6801, DOI: 10.3233/JHS-2012-0452. Cited in EESR dated Sep. 13, 2019 for corresponding European patent application No. 19177257.3.

Byeong-Thaek Oh et al.,"A peer mutual authentication method on super peer based peer-to-peer network" Consumer Electronics, 2008. ISCE 2008. IEEE International Symposium on, IEEE, Piscataway, NJ, USA, Apr. 14, 2008, pp. 1-4, XP031283598, ISBN: 978-1-4244-2422-1. Cited in EESR dated Sep. 13, 2019 for corresponding European patent application No. 19177257.3.

Bok, Kyoungsoo et al., "Cooperative caching for multimedia data in mobile P2P networks", Multimedia Tools And Applications, Kluwer Academic Publishers, Boston, US, vol. 78, No. 5, Jun. 2, 2017, pp. 5193-5216, XP036754809.

EESR—Extended European Search Report for European Patent Application No. 20203835.2, dated Feb. 5, 2021.  Remaining references cited in the EESR were previously submitted in the IDS filed on Sep. 24, 2019. .

* cited by examiner

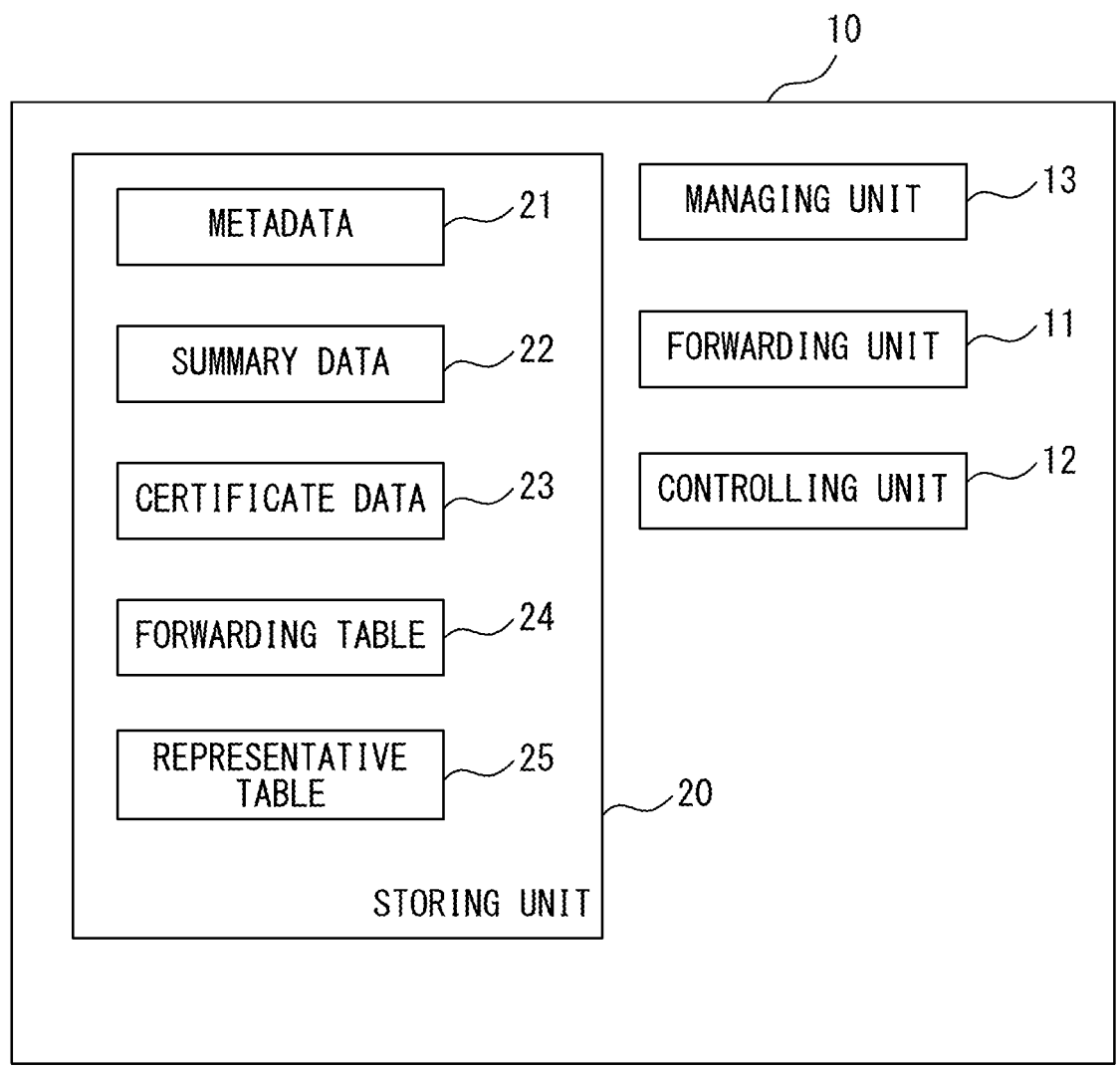
F I G. 2

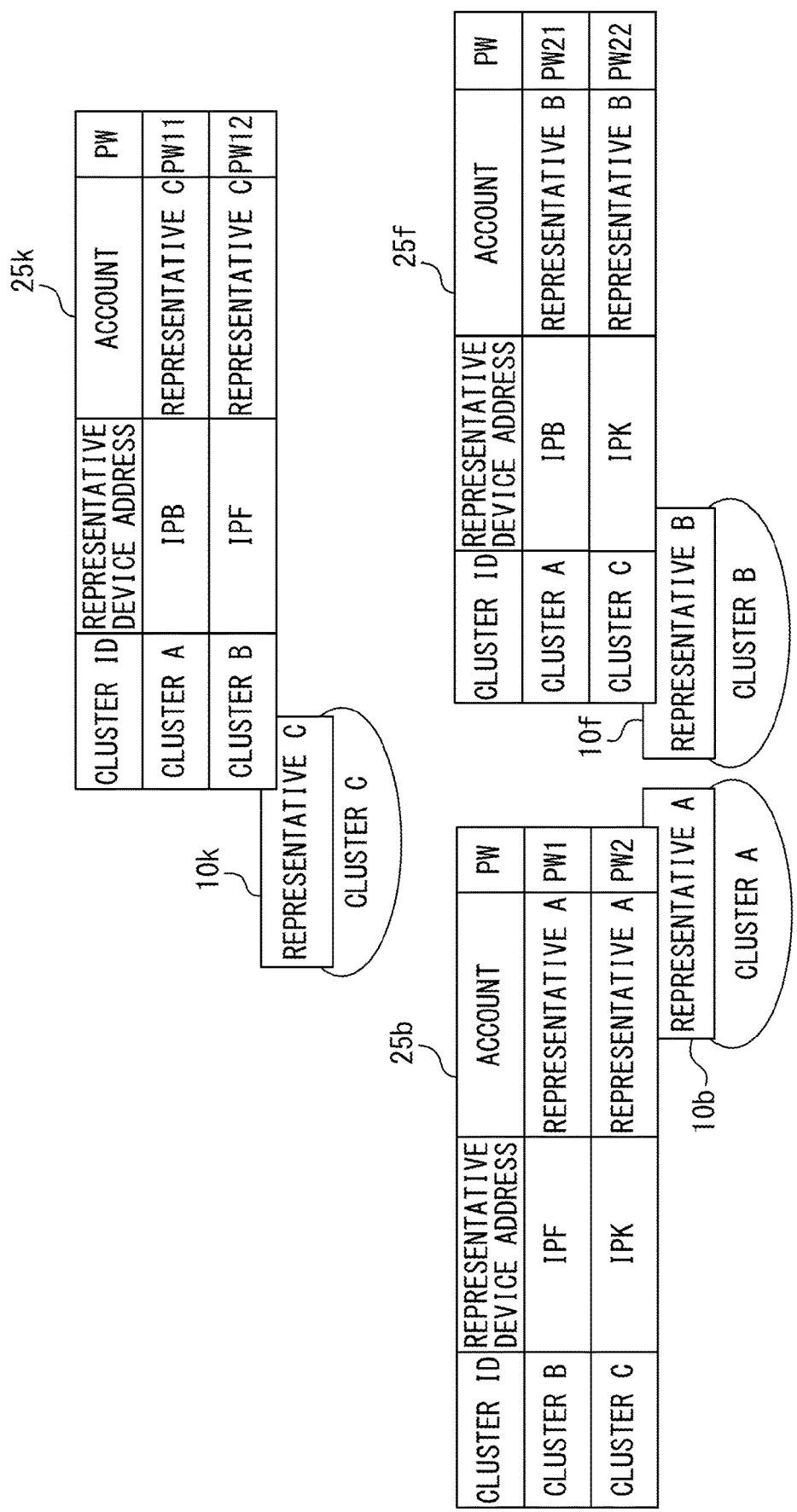
F I G. 4

F I G. 5

T1

| ITEM | ISSUING USER ID | DESTINATION INFORMATION | DATA ATTRIBUTE INFORMATION |
|---|---|---|---|

C1

| ITEM | DESCRIPTION |
|---|---|
| DATA ID | |
| CLUSTER ID | OWN CLUSTER ID |
| CONNECTION ADDRESS | ADDRESS OF ACCESS DESTINATION |
| DESCRIPTION | DATA DESCRIPTION TEXT ************************ ************************ ************************ ******************** |
| DISCLOSURE DESTINATION INFORMATION | LIST OF USER ACCOUNTS INSIDE/OUTSIDE CLUSTER TO WHICH DISCLOSURE IS MADE |
| BLOCK INFORMATION | TRANSACTION ID, TIME |

C2

| ITEM | DESCRIPTION |
|---|---|
| CLUSTER ID | CLUSTER ID OF CONNECTION DESTINATION |
| REPRESENTATIVE DEVICE ADDRESS | ADDRESS OF REPRESENTATIVE DEVICE OF CONNECTION DESTINATION |
| KEYWORD/ CATEGORY | ××/○○ |
| DISCLOSURE DESTINATION INFORMATION | LIST OF USER ACCOUNTS TO WHICH DISCLOSURE IS MADE |
| BLOCK INFORMATION | TRANSACTION ID WHEN METADATA WAS MADE PUBLIC, TIME |

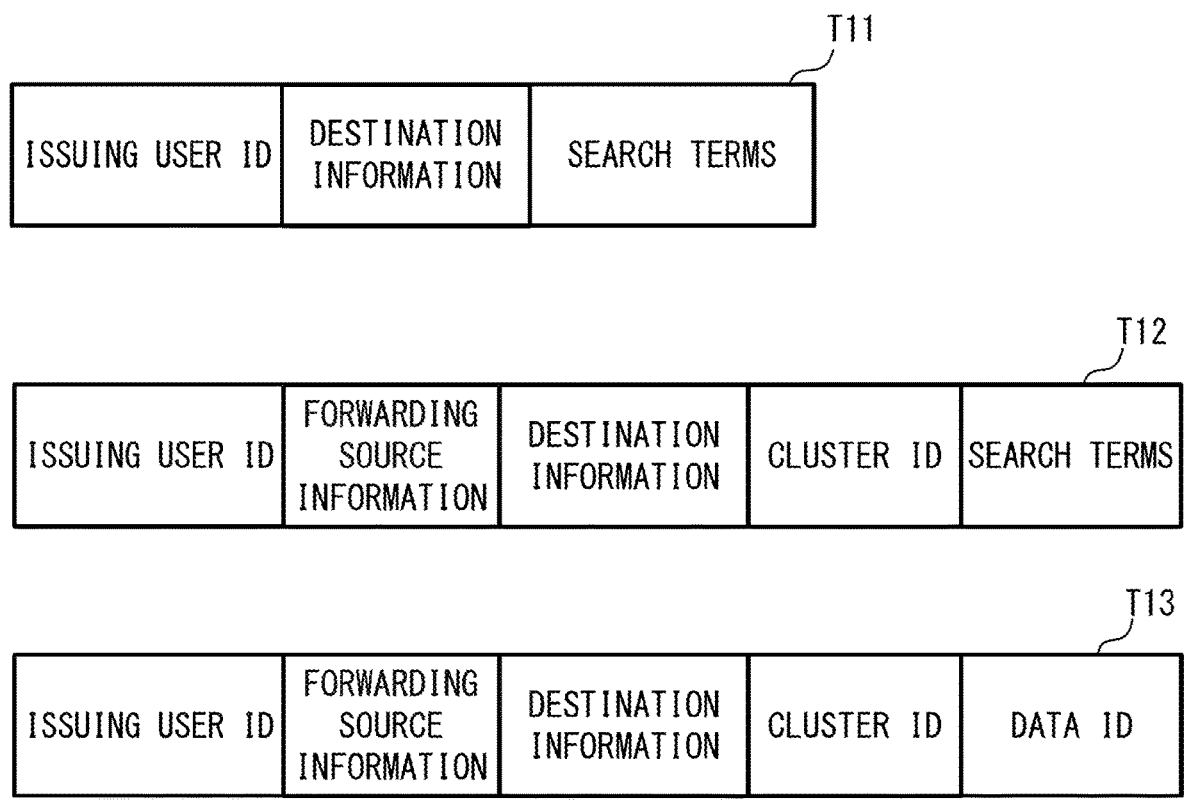
F I G. 7

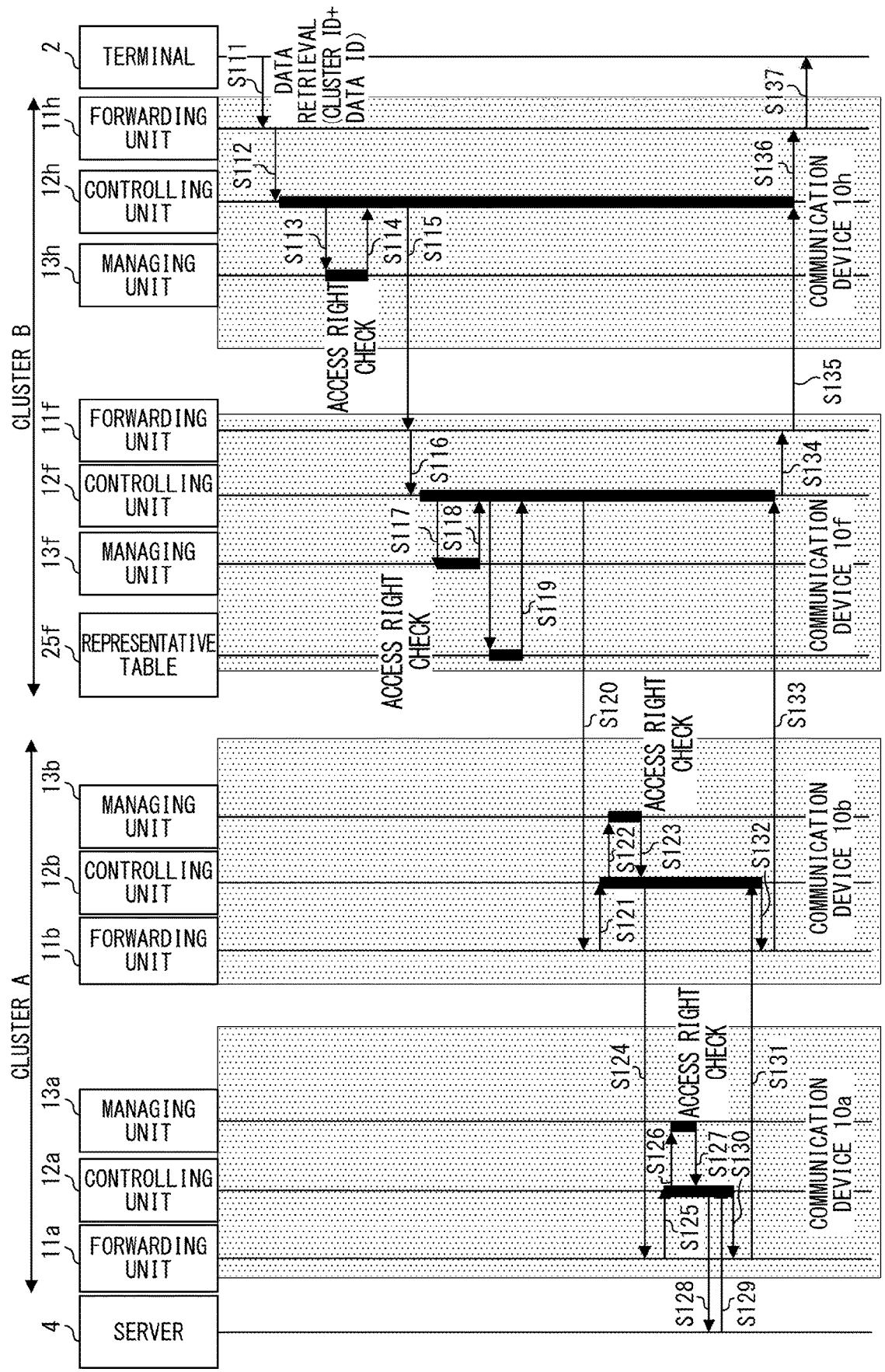
F I G. 16

COMMUNICATION DEVICE AND COMMUNICATION METHOD

CROSS-REFERENCE TO RELATED APPLICATIONS

This application is based upon and claims the benefit of priority of the prior Japanese Patent Application No. 2018-107598, filed on Jun. 5, 2018, the entire contents of which are incorporated herein by reference.

FIELD

The embodiments discussed herein relate to a communication device and a communication method.

BACKGROUND

In recent years, expectation has been increasing for digital transformation that creates new services and businesses by circulating and using various digitized data. As a method for circulating data in the cases where data are distributed over a plurality of sites, such as between different companies and organizations, it has been proposed to share digital files using peer-to-peer communication between devices.

As a related art, a system has been proposed in which device information that makes it possible to identify the main node in a network from outside the network is registered in a server providing a directory service, and metadata of contents being disclosed are also registered in the server. In this system, a device outside the network obtains the address of the main node and the meta information from the server and obtains distributed contents via the main node.

A method has also been proposed in which, in order to secure the security of the contents, contents encrypted with an encryption key are transmitted to a client terminal via a relay server. In this method, a cache server or the like can be used when distributing contents and the client terminal decrypts the encrypted contents using a decryption key obtained from a ticket server.

For example, documents such as Japanese Laid-open Patent Publication No. 2006-190205 and Japanese Laid-open Patent Publication No. 2003-179597 have been known.

In a case in which data are circulated between different companies, organizations and the like, the data that are the target of circulation are stored in a manner distributed over different networks. In such cases where data are separated and managed in different networks, no central control is performed for the storage locations of the data in all the networks. For this reason, it is difficult for a user that attempts to retrieve data existing in another network to identify the storage location of the data that is the target of the retrieval. As a result, the circulation of data has not been promoted, and there are many data that have not been fully utilized.

SUMMARY

According to an aspect of the embodiments, a communication device belonging to a first cluster among a plurality of clusters includes a memory, a processor, and a network connection device. The memory stores identification information of another cluster that has information being retrievable by a terminal connecting to the communication device in a summary of data held by the other cluster. The processor performs, upon receiving a combination of identification information of a second cluster that holds retrieval-target data and identification information of the retrieval-target data from the terminal that accessed the summary, a control to request target data identified by the combination. The network connection device forwards the target data to the terminal.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 2 is a diagram illustrating an example of the configuration of a communication device;

FIG. 4 is a diagram illustrating an example of a representative table;

FIG. 5 is a diagram illustrating an example of metadata and summary data;

FIG. 7 is a diagram illustrating an example of information included in each transaction;

FIG. 16 is a sequence diagram illustrating an example of a process for retrieving data.

DESCRIPTION OF EMBODIMENTS

Figure 1:
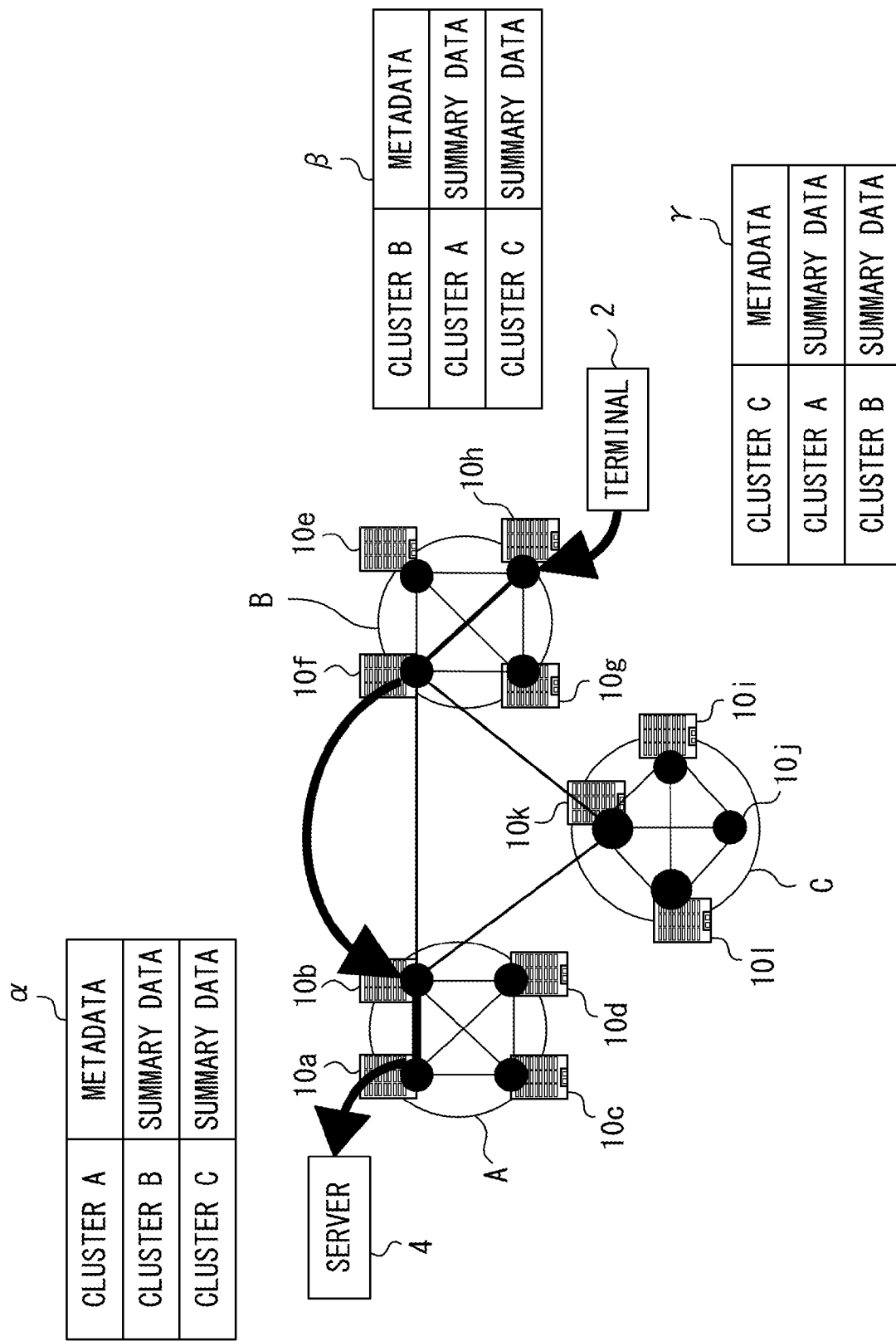
FIG. 1 is a diagram illustrating an example of a communication method according to an embodiment.

FIG. 1 is a diagram illustrating an example of a communication method according to an embodiment. In the system presented in FIG. 1, three networks, namely clusters A through C are included. In the example in FIG. 1, the cluster A includes communication devices 10a through 10d. The cluster B includes communication devices 10e through 10h, and the cluster C includes 10i through 10l. Each of the communication devices 10 is able to operate as a gateway device, for example. To each of the communication devices 10, a terminal 2 of the user that is going to retrieve data, and/or a server 4 of the provider that is going to provide data are connected. In the example in FIG. 1, the server 4 of the provider of data is connected to communication device 10a, and the terminal 2 of the user that is going to retrieve data is connected to communication device 10h. Meanwhile, FIG. 1 is an example, and the number of clusters (networks)

in the system, the number of the communication devices 10 included in each of the clusters, the number of terminals and the connection destination of the terminals are arbitrary. For example, the cluster may be a consortium in the blockchain technology.

It is assumed that, in each cluster, in advance, authentication is performed for the communication devices 10 that belong to the cluster, the terminals that connect to the communication devices 10 in the cluster, and the like. In addition, in each cluster, a communication device 10 (a representative device) is also included to which authentication has been granted in advance to enable access to other clusters. The representative device accesses other clusters as a representative of other communication devices 10 in the cluster. In the example in FIG. 1, the communication device 10b is able to access the cluster B and the cluster C and accesses the cluster B and/or the cluster C in place of other communication devices 10 in the cluster A. In a similar manner, the communication device 10f accesses the cluster A and/or the cluster C as a representative of the communication devices 10 in the cluster B. In addition, the communication device 10k accesses the cluster A and/or the cluster B as a representative of the communication devices 10 in the cluster C.

In the communication method according to the embodiments, in order to ensure security, data to be the target of circulation is held in the server 4 of the provider of the data. The communication devices 10 in the cluster that includes the communication device 10 to which the server 4 of the provider of the data is connecting hold metadata of the data to be the circulation target, instead of the data to be the target of the circulation. The communication device 10 to be the representative device generates and reports, to communication devices in other clusters, summary data that summarize the metadata of data distributed via the communication devices 10 in the cluster to which the device itself belongs. Accordingly, each communication device 10 is able to hold, in addition to the information obtained in the cluster to which the device itself belongs, information obtained from other clusters. For example, as presented in α in FIG. 1, the communication devices 10a through 10d hold metadata of data that can be circulated in the cluster A, and summary data of data that can be circulated in the cluster B and the cluster C. As presented in β in FIG. 1, the communication devices 10e through 10h hold metadata of data that can be circulated in the cluster B and summary data of data that can be circulated in the cluster A and the cluster C. As presented in γ in FIG. 1, the communication devices 10i through 10l hold metadata of data that can be circulated in the cluster C and summary data of data that can be circulated in the cluster A and the cluster B.

The communication device 10 reports, in response to an inquiry from a terminal that connects to the device itself, information with respect to data retrievable by the terminal. Upon receiving, from a terminal, a combination of identification information of the cluster in which data that is the target of retrieval is stored and identification information identifying data that is the target of retrieval, the communication device 10 retrieves data identified by the combination. Meanwhile, at this time, communication across clusters is performed by the representative devices. For example, it is assumed that data identified by the data ID=X is held in the server 4. In addition, it is assumed that the terminal 2 of the user has transmitted a retrieval request for the data of the data ID=X to the communication device 10h together with information identifying the cluster A. Then, the communication device 10h accesses the cluster A via the communication device 10f and the communication device 10b. The communication device 10b makes a request to the communication device 10a for the data of the data ID=X using metadata or the like held by the device itself. Then, the communication device 10a retrieves and transmits, to the communication device 10b, the data of the data ID=X from the server 4. The data of the data ID=X arrives at the communication device 10h from the communication device 10b via the communication device 10f. Then, the communication device 10h forwards the data of the data ID=X to the terminal 2.

Meanwhile, the example in FIG. 1 is an example, and the terminal 2 and/or the server 4 may be connected to the representative device of the cluster. For example, in a case in which the terminal 2 is connected to the communication device 10f and retrieves data in the server 4, the communication device 10f retrieves and forwards, to the terminal 2, data from the server 4 via the communication device 10b and the communication device 10a, in response to a retrieval request for the data from the terminal 2.

As described above, in the communication method according to the embodiments, the communication device 10 in each cluster is able to hold summary data with respect to data that can be retrieved via the communication devices 10 in clusters to which the device itself does not belong and to provide the summary data to the terminal of the user. Accordingly, using the summary data, a terminal of the user that is going to retrieve data is able to identify where the target data that is going to be retrieved is stored. Therefore, even when data are retrieved through communication across a plurality of clusters, the terminal can easily identify the storage location of data, and as a result, circulation of data is promoted.

In addition, the communication between clusters is performed by the representative devices, and the representative devices have been granted authentication in each cluster, and therefore, security of communication at each cluster is also ensured.

Furthermore, in the method according to the embodiment, regarding data that can be retrieved from clusters to which the local device does not belong, each communication device 10 only hold summary data obtained by summarizing metadata. Accordingly, compared to the case in which each communication device 10 holds metadata of data that may be obtained from all the clusters, the amount of data held by each communication device 10 may be reduced.

<Device Configuration>

FIG. 2 is a diagram illustrating an example of the configuration of the communication device 10. The communication device 10 has a forwarding unit 11, a controlling unit 12, a managing unit 13, a storing unit 20. The storing unit 20 has metadata 21, summary data 22, certificate data 23, and a forwarding table 24. The communication device 10 that operates as a representative device holds, in addition, a representative table 25.

The forwarding unit 11 forwards data to terminals and other communication devices 10. At this time, the forwarding unit 11 is able to provide functions as a proxy server using the forwarding table 24 set by the controlling unit 12. The controlling unit 12 performs control for retrieving metadata and data, setting to the forwarding table 24, a control process for the forwarding unit 11, and so on. The managing unit 13 performs an authentication process for the communication device 10 and the terminal 2, and a verification process for the content of an issued transaction. The managing unit 13 obtains, as is appropriate, the verification result at other communication devices 10 and permits the specified communication when a certain proportion of the communication devices 10 in the cluster determine that the content of the transaction is correct. That is, the managing unit 13 realizes the functions of the smart contract in the consortium-type blockchain technology or the like. For example, the controlling unit 12 and the managing unit 13 may be realized as an application used for processes such as the retrieval of data using the blockchain technology.

The metadata 21 is generated from attribute information of data reported from the server 4 being the provision source of the data and is registered in the communication device 10 being the connection destination of the provider server 4 and the communication devices 10 in the cluster to which the communication device 10 being the connection destination belongs. The metadata 21 includes information of an address used when other devices in the cluster find data and/or establish connection for retrieving data, and the like. Therefore, the metadata 21 is used as a distributed ledger for data that can be circulated in the communication in the cluster. The summary data 22 is a summary of data that can be retrieved from a cluster to which the communication device 10 does not belong and is generated by summarizing the metadata 21. Therefore, by combining the metadata 21 and the summary data 22, information that corresponds to a distributed ledger of the entire system used in the blockchain technology is obtained. The certificate data 23 is a digital certificate distributed to the communication device 10 in advance to be used for the authentication process, to perform communication in the cluster. The forwarding table 24 is a routing table used for specifying an address for retrieval and/or forwarding of data. The representative table 25 holds information used when the communication device 10 that operates as a representative device accesses a cluster other than the cluster to which the device itself belongs. Examples of the metadata 21, the summary data 22, the forwarding table 24, and the representative table 25 are described later.

Figure 3:
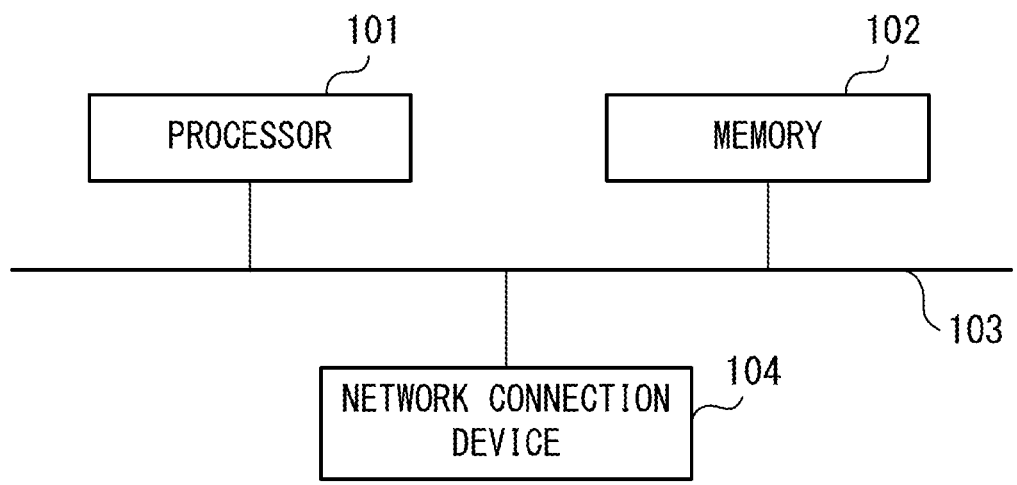
FIG. 3 is a diagram illustrating an example of the hardware configuration of a communication device.

FIG. 3 is a diagram illustrating an example of the hardware configuration of the communication device 10. The communication device 10 has a processor 101, a memory 102, a bus 103, and a network connection device 104. The processor 101 is an arbitrary processing circuit and may be a CPU (Central Processing Unit), for example. The processor 101 executes various processes by executing a program or programs using the memory 102 as a working memory. A program can be provided as stored in a non-transitory and computer-readable storage medium, and may be installed on the communication device 10. In the memory 102, RAM (Random Access Memory) is included, and also non-volatile memories such as ROM (Read Only Memory) are also included. The memory 102 stores programs and/or data used for processing at the processor 101. The network connection device 104 is used for communication with other devices via a network. The bus 103 connects the processor 101, the memory 102, and the network connection device 104 so as to enable input and output of data with each other.

In the communication device 10, the controlling unit 12 is realized by the processor 101. The forwarding unit 11 is realized by the network connection device 104. In addition, the managing unit 13 is realized by the processor 101 and the network connection device 104.

Embodiments

In the embodiments below, first, an example of information held by the communication device 10 and examples of transactions are explained, and after that, specific examples of communication between devices are explained. Meanwhile, in the explanation below, a case is taken as an example in which each of a plurality of clusters included in a system is a consortium in the consortium-type blockchain technology.

(1) Example of Information Held by the Communication Device 10 and Examples of Transactions FIG. 4 is a diagram illustrating an example of the representative table 25. With reference to FIG. 4, communication across clusters is explained. In the example in FIG. 4, it is assumed that the representative device of the cluster A is the communication device 10b. In addition, it is assumed that the representative device of the cluster B is the communication device 10f, and the representative device of the cluster C is the communication device 10k. Communication between the clusters is performed via the communication devices that operate as representative devices, and the communication device 10 other than the representative devices do not communicate with the communication devices 10 in other clusters. Accordingly, when a communication device 10 retrieves data from another cluster, it requests the representative device in the cluster to which the device itself belongs to retrieve data from the representative device of the cluster in which the data is stored, and it retrieves the data from the representative device in the cluster to which the device itself belongs. For example, when the communication device 10a in the cluster A retrieves data stored in a device in the cluster B, the communication device 10b that is the representative device of the cluster A retrieves the data specified by the communication device 10a via the communication device 10f that is the representative device of the cluster B. After that, the communication device 10b forwards the data retrieved from the communication device 10f to the communication device 10a. In a similar manner, communication between other clusters is also performed via the representative device of each cluster.

In each cluster, a digital certificate used for authentication is provided, and also, an account and a password (PW) used when connecting to the cluster are set, in advance, to the communication devices 10 that belong to the cluster and to terminals and the like that can connect to the communication devices 10 in the cluster. The communication device 10 that operates as a representative device holds, in advance, in the representative table 25, an account and a password used when accessing a cluster that is not the cluster to which the device itself belongs.

The representative table 25b is an example of the representative table 25 held by the communication device 10b. In the representative table 25, in addition to an account and a password, a cluster ID and a representative device address are included. The cluster ID is identification information identifying the connection-destination cluster. The representative device address is an address assigned to the communication device 10 that operates as a representative device in the cluster that is identified by the cluster ID in an entry. For example, the first entry of the representative table 25b records that, when the communication device 10b accesses the cluster B, it accesses a device of the address=IPF (the communication device 10f) using an account "Representative A" and a password "PW1". In a similar manner, the communication device 10f refers to the representative table 25f when connecting to the cluster A or the cluster C, and the communication device 10k refers to the representative table 25k when connecting to the cluster A or the cluster B.

FIG. 5 is a diagram illustrating examples of the metadata and the summary data. With reference to FIG. 5, an example of the method for generating the metadata and the summary data is explained. T1 is an example of information elements included in the metadata registration transaction. The metadata registration transaction is used when the provider of the data registers, in the communication device 10, metadata of providable data. The metadata registration transaction includes an issuing user ID, destination information, and data attribute information. The issuing user ID is information that identifies the device that has requested the registration of metadata. The destination information is information that identifies the destination of the metadata registration transaction. The data attribute information includes a value for each of the information elements. The provider of data transmits the metadata transaction to the communication device 10 being the connection destination.

Upon receiving the metadata registration transaction, the communication device 10 generates metadata by extracting, in accordance with the data format of metadata, the information included as data attribute information.

Case C1 in FIG. 5 presents an example of the metadata. Here, the metadata is information included as data attribute information, therefore, it can also be said that the case C1 is an example of data attribute information of the metadata registration transaction. In the example in the case C1, a data ID, a cluster ID, a connection address, a description, disclosure destination information, and block information are included in the metadata. Here, the data ID is arbitrary identification information by which data may be uniquely identified. For example, as the data ID, a hash value of data to be provided may be used. The cluster ID is the identifier of the cluster to which the provider of data connects. The description of data is information identifying the attributes of data, the purpose of using of the data, and so on. The connection address is the address of the access destination in a case in which the data are retrieved. The communication device 10 that received the metadata registration transaction sets the connection address to the address assigned to the transmission source of the metadata registration transaction. The disclosure destination information is used for setting users who may access the data. The block information includes a transaction ID, time information, and the like.

The metadata 21 is generated for each data. Therefore, for example, the communication devices 10 that are included in the cluster A are to store the same number of metadata 21 as the number of data that may be provided via the cluster A. The description of data is information that explains how to use the data and the attributes of the data, and therefore, its size may become large. For example, when the description of data includes an image or a video, despite being metadata, it becomes relatively large.

Then, from the metadata, the summary data that is a summary of a part of the information elements of the metadata is generated. Case C2 in FIG. 5 presents an example of the summary data. The summary data includes a cluster ID, a representative device address, a keyword/category, disclosure destination information, and block information. The keyword and the category are used in such a case as when searching for retrieval-target data, or the like. For example, the keyword=earthquake, the category=weather information may be set. The keyword and the category may also be words, phrases, or the like extracted from the description of data in the metadata. The block information includes the transaction ID and/or time information at the time when the metadata was made public. The representative device address is the address of the representative device that is to be the access destination in the case when the data is retrieved.

Meanwhile, the generated summary data does not have to be in the same number as that of the metadata, and a plurality of metadata may be gathered in one summary data. For example, when the disclosure destination information and the cluster ID are the same for a plurality of metadata, information extracted from the plurality of metadata may be made into one summary data. For example, it is assumed that the four metadata presented in the case C1 have the same disclosure destination and the same cluster to which the device holding the data belongs. In this case, the metadata C1 presented in the case C1 may be gathered in one summary data, as presented in the case C2.

The summary data is smaller in size than the metadata, and moreover, as presented in FIG. 5, a plurality of metadata may be put together. Therefore, by using the summary data instead of the metadata with respect to the data held in other clusters, the burden put on the communication device 10 is smaller than in the case when the metadata is stored.

Figure 6:
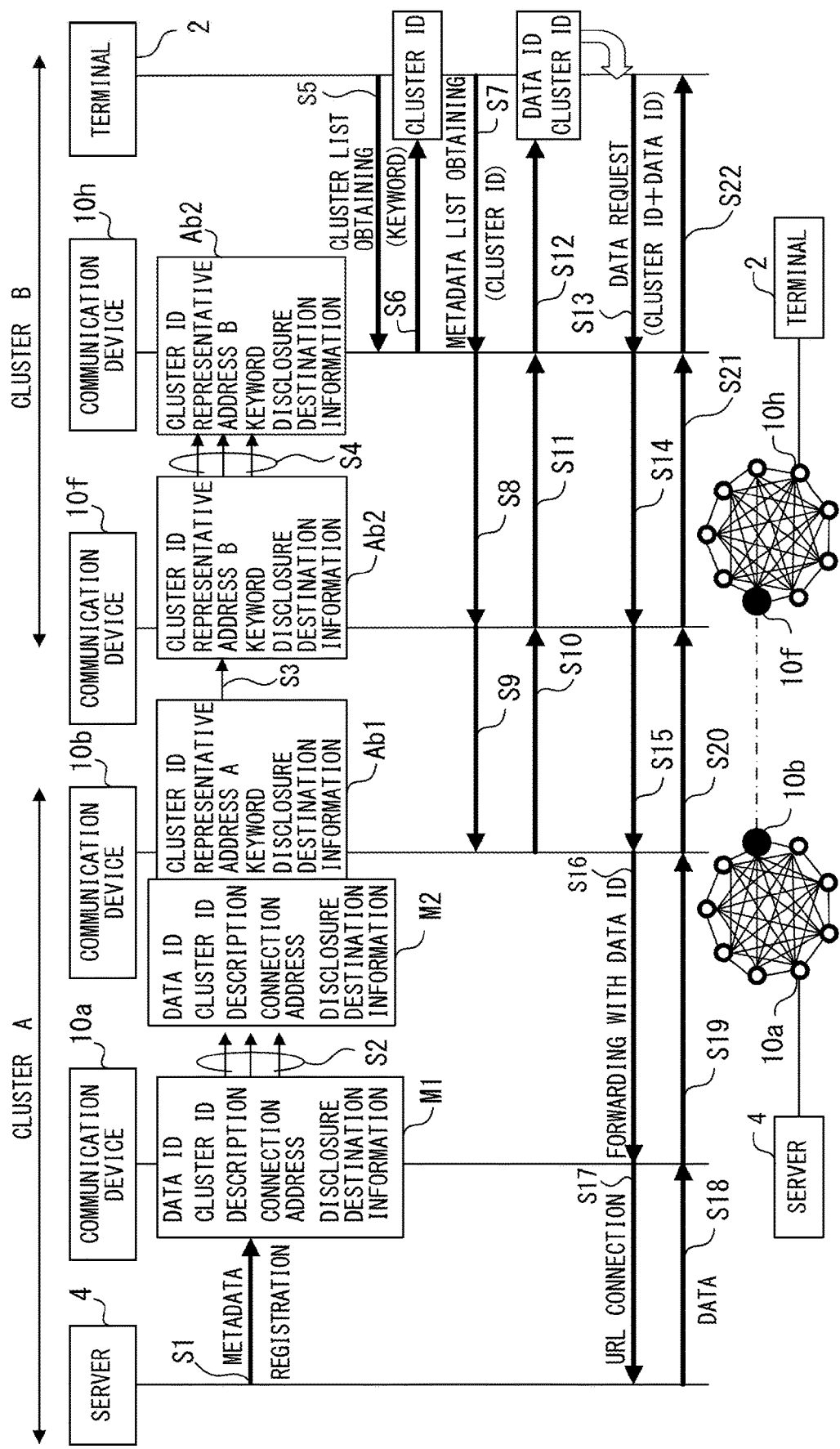
FIG. 6 is a diagram illustrating an example of information held by a communication device and an example of the outline of a communication process.

FIG. 6 is a diagram illustrating an example of information held by the communication device 10 and an example of an outline of the communication process. FIG. 6 is explained while taking as an example a case in which the server 4 connecting to the cluster A provides data to the terminal 2 connecting to the cluster B. In the example in FIG. 6, it is assumed that the server 4 connects to the communication device 10a, and the terminal 2 connects to the communication device 10h. Meanwhile, in the explanation below, in order to clarify the communication device 10 that is executing the operation, an alphabet assigned to the communication device 10 that is executing the operation may be presented at the end of the numerals. For example, the controlling unit 12a is the controlling unit 12 of the communication device 10a. In a similar manner, the forwarding table 24b is the forwarding table 24 held by the communication device 10b.

First, taking as an example a case in which data are provided from the server 4, an example of information held by the communication device 10 is explained. The server 4 transmits a metadata registration transaction including information of data to be provided to the terminal 2 to the communication device 10a that is the connection destination (Step S1). For example, in the example in FIG. 6, it is assumed that, in data attribute information of the metadata registration transaction, the terminal 2 in the cluster B and the communication device 10f that operates as the representative device are set as disclosure destination information.

The communication device 10a generates metadata M1 using information extracted from data attribute information of the obtained metadata registration transaction. It is assumed that the metadata M1 includes, in addition to the data ID and data description, following information.

Cluster ID=Cluster A
Connection address=the address assigned to the server 4
Disclosure destination information=the terminal 2 in the cluster B, the communication device 10f The communication device 10a stores, in the forwarding table 24a, the connection address in the metadata M1 in association with the data ID. Further, the communication device 10a converts the connection address in the metadata M1 to the address set for the communication device 10a itself to generate metadata M2 including following information.

Cluster ID=Cluster A
Connection address=the address assigned to the communication device 10a
Disclosure destination information=the terminal in the cluster B, the communication device 10f The communication device 10a forwards the metadata M2 to other communication devices 10 in the cluster A (Step S2). Other communication devices 10 that received the metadata M2 store the metadata M2 and also records, in the forwarding table 24, information of the access-destination of the metadata M2 in association with the data ID of the metadata M2. Accordingly, the address of the server 4 is concealed from the communication devices 10 in the cluster A other than the communication device 10a.

The communication device 10b is the representative device of the cluster A, and therefore, upon receiving the metadata M2, it generates summary data Ab1. In the example in FIG. 6, a cluster ID, a keyword, and disclosure destination information are included in the summary data Ab1, and further, as the address of the access destination of data, the address assigned to the communication device 10b (Representative address A) is included. The communication device 10b transmits the summary data Ab1 to the representative devices of other clusters, as is appropriate, using the representative table 25b (Step S3). Therefore, it follows that, to the representative devices of the clusters other than the cluster A, it has been reported that the communication device 10b is the data inquiry destination for data regarding the summary data Ab1.

Upon receiving the summary data Ab1, the communication device 10f that is the representative device of the cluster B changes the address of the access destination of the data to the address assigned to the communication device 10f itself (Representative address B) to generate summary data Ab2. The communication device 10f transmits the summary data Ab2 to other communication devices 10 in the cluster B (Step S4). The communication devices 10 that received the summary data Ab2 store the summary data Ab2. Accordingly, each of the communication device 10 that received the summary data sets the inquiry destination of the data regarding the summary data to the representative device in the cluster to which the device itself belongs. For example, the communication device 10h stores the summary data Ab2 and sets the inquiry destination regarding the summary data Ab2 to the communication device 10f.

Next, with reference to the outline of the communication processes performed when the terminal 2 retrieves data, examples of transactions used for the processes and example of information elements in the transactions are explained. The terminal 2 inquires, when retrieving data from a cluster other than the cluster B, the communication device 10h for the identification information of the cluster that holds retrievable data (Step S5). At this time, a cluster list obtaining transaction is used for the inquiry process.

T11 in FIG. 7 is an example of information included in the cluster list obtaining transaction. In the cluster list obtaining transaction, an issuing user ID, destination information, and search terms are included. The issuing user ID is information identifying the device that issued the cluster list obtaining transaction. In the example in Step S5 of FIG. 6, the issuing user ID is information identifying the terminal 2. The destination information is information of the device to be the destination of the cluster list obtaining transaction. In the example of Step S5 in FIG. 6, the destination information is information of the communication device 10h. The search terms are information such as a keyword about data that the terminal 2 is going to retrieve, and the user account issued to the terminal 2.

Upon receiving the cluster list obtaining transaction, the communication device 10h reports, to the terminal 2, among the stored summary data, those that includes the specified keyword (Step S6 in FIG. 6).

The terminal 2 decides the cluster being the access destination using the reported summary data. Further, the terminal 2 requests the communication device 10h to retrieve metadata of retrievable data from the cluster being the access destination, in order to identify the identification information of the data to be retrieved (Step S7). For the retrieving request for metadata, a metadata list obtaining transaction is used.

T12 in FIG. 7 is an example of information included in the metadata list obtaining transaction. In the metadata list obtaining transaction, an issuing user ID, forwarding source information, destination information, a cluster ID, and search terms are included. The issuing user ID is information identifying the device that issued the metadata list obtaining transaction. The forwarding source information is information of the communication device 10 that forwarded the metadata list obtaining transaction. The destination information is information of the device to be the destination of the metadata list obtaining transaction. The cluster ID is information identifying the cluster that is that target of retrieval of metadata. The search terms include information such as a keyword about data that the terminal 2 is going to retrieve, and the user account issued to the terminal 2. For example, when retrieval of the list of metadata included in the cluster A is requested according to Step S7 in FIG. 6, a metadata list obtaining transaction including following information is transmitted.

Issuing user ID=Terminal 2
    Forwarding source information=Terminal 2
    Destination information=Communication device 10h
    Cluster ID=Cluster A
    Search terms=UserA Then, the communication device 10h that received the metadata list obtaining transaction requests the metadata shared in the cluster A from the communication device 10f (FIG. 6, Step S8). At this time, the communication device 10h replaces the forwarding source information in the metadata list obtaining transaction with information of the communication device 10h itself and forwards the metadata list obtaining transaction after the replacement to the communication device 10f. The communication device 10f retrieves metadata shared among the commination devices 10 in the cluster A via the communication device 10b that is the representative device in the cluster A and forwards it to the communication device 10h (Step S9 through S11). The communication device 10h forwards the obtained metadata 21 to the terminal 2 (Step S12).

The terminal 2 identifies the data ID of the retrieval-target data, using the metadata retrieved from the communication device 10h. The terminal 2 transmits a data retrieval transaction including the data ID and the cluster ID to the communication device 10h (Step S13).

T13 in FIG. 7 is an example of information included in the data retrieval transaction. The data retrieval transaction includes an issuing user ID, a forwarding source information, destination information, a cluster ID, and a data ID. The issuing user ID is an information identifying the device that issued the data retrieval transaction. The forwarding source information is information of the communication device that forwarded the data retrieval transaction. The destination information is information of the device to be the destination of the data retrieval transaction. The cluster ID is information identifying the cluster to which the device that holds data to be the retrieval target. The data ID is information identifying data that the transmission source of the data retrieval transaction is going to retrieve. For example, in a case in which data identified by Data X in the cluster A is requested according to Step S13 in FIG. 6, the data retrieval transaction including following information is transmitted.

Issuing user ID=Terminal 2
Forwarding source information=Terminal 2
Destination information=Communication device 10*h* the cluster ID=Cluster A
Data ID=Data X The communication device 10*h* forwards, to the communication device 10*f*, the data retrieval transaction in which information of the communication device 10*h* is included in the forwarding source information (FIG. 6, Step S14). The cluster A is specified in the cluster ID in the data retrieval transaction, and therefore, the communication device 10*f* forwards the data retrieval transaction to the communication device 10*b* that is the representative device of the cluster A (Step S15). The communication device 10*b* searches the forwarding table 24*b* with the data ID being the key. In the forwarding table 24*b*, regarding data identified by the data ID=Data X, the connection destination is set as the communication device 10*a*. Therefore, the communication device 10*b* forwards the data retrieval transaction to the communication device 10*a* (Step S16).

The communication device 10*a* searches the forwarding table 24*a* with the data ID being the key. In the forwarding table 24*a*, with respect to the data identified by the data ID=Data X, the connection destination is set as the server 4. Accordingly, the communication device 10*a* retrieves the data identified by the data ID from the server 4 (Step S17, S18). The communication device 10*a* transmits, as a response to the data retrieval transaction, the obtained data to the communication device 10*b* (Step S19). The communication device 10*b* forwards, as a response to the data retrieval transaction, the data obtained from the communication device 10*a* to the communication device 10*f* (Step S20). The communication device 10*f* forwards, as a response to the data retrieval transaction, the data obtained from the communication device 10*b* to the communication device 10*h* (Step S21). The communication device 10*h* forwards, as a response to the data retrieval transaction, the data obtained from the communication device 10*f* to the terminal 2 (Step S22).

Meanwhile, distribution of summary data and retrieval of data are performed between other clusters and the cluster A in a similar manner as between the cluster A and the cluster B, while not presented in FIG. 6.

As explained with reference to FIG. 6, the communication devices 10 hold the summary data 22 with respect to data that may be retrieved via other clusters, and therefore, the terminal 2 is able to refer to the summary data 22 to retrieve information for accessing data in other clusters. In addition, the summary data 22 is a summary of the metadata 21, and therefore, information elements are less than those of the metadata 21, and the amount of data is also smaller. Accordingly, it is possible to prevent each communication device 10 from storing a huge amount of data.

(2) Example of Communication Between Devices

Hereinafter, specific examples of communication between devices are explained while dividing it into a process for registering the metadata, a process for obtaining the cluster list, a process for retrieving metadata and a process for retrieving data. In the explanation below, the case is also taken as an example in which data are provided to the terminal 2 that connects to the cluster B from the server 4 connecting to the communication device 10*a* of the cluster A. In addition, it is assumed that the terminal 2 is connecting to the communication device 10*h* of the cluster B.

(2a) Process for Registering the Metadata

Figure 8:
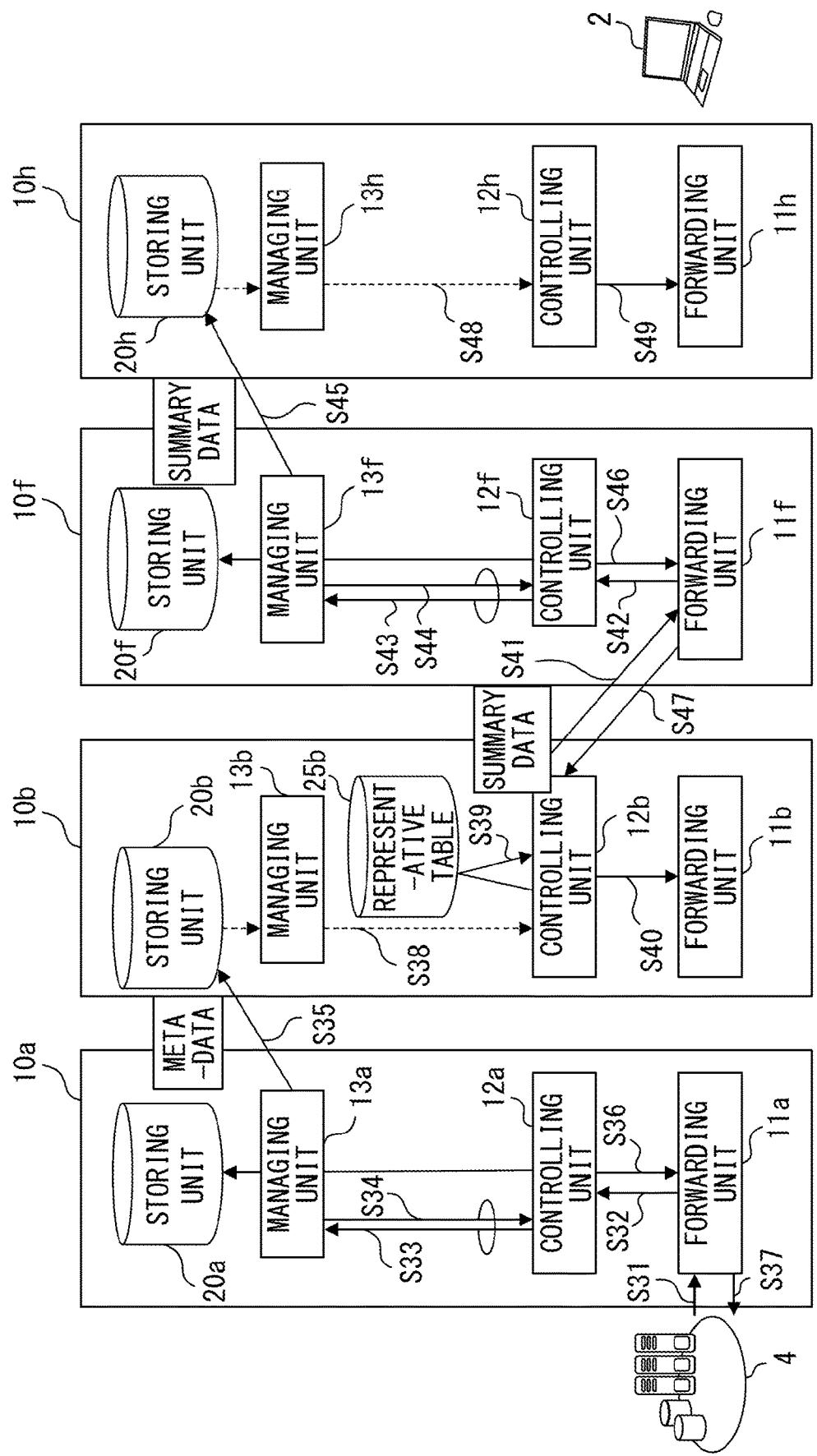
FIG. 8 is a diagram illustrating an example of a registration process for metadata.
Figure 9:
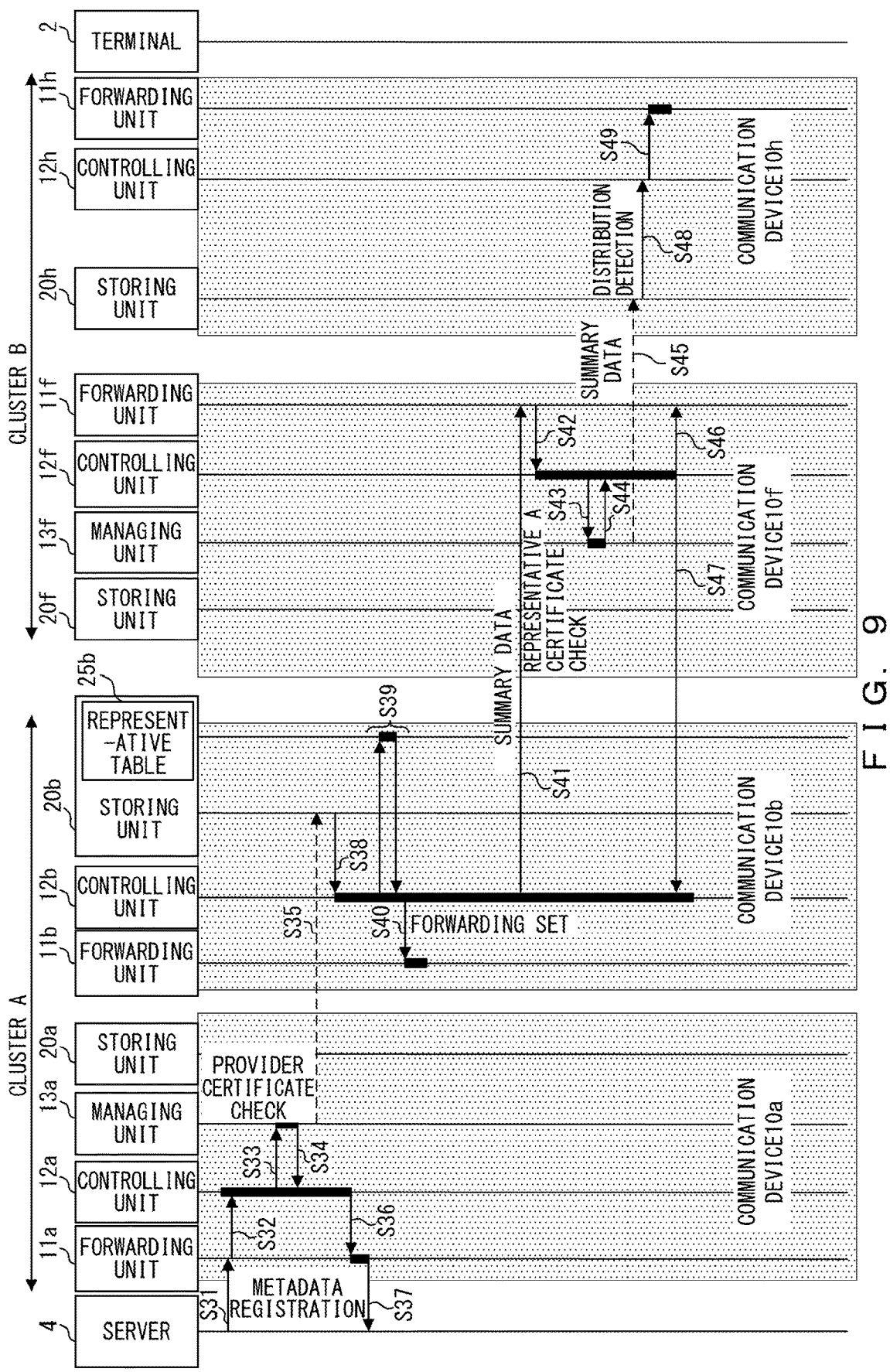
FIG. 9 is a sequence diagram illustrating an example of a registration process for metadata.

FIG. 8 is a diagram illustrating an example of the process for registering the metadata. FIG. 9 is a sequence diagram illustrating an example of the process for registering the metadata. Hereinafter, with reference to FIG. 8 and FIG. 9, details of the process performed at each device at the time of the process for registering the metadata are explained.

The server 4 of the provider generates a metadata registration transaction including information of data to be provided to the terminal 2. The server 4 transmits the metadata registration transaction to the communication device 10*a* together with a digital certificate that has been obtained for the connection to the cluster A (Step S31). Meanwhile, in the metadata registration transaction generated by the server 4, the access destination of data is set as the address of the server 4 itself.

Upon receiving the metadata registration transaction, the forwarding unit 11*a* in the communication device 10*a* forwards it to the controlling unit 12*a* (Step S32). The controlling unit 12*a* outputs the digital certificate received together with the metadata registration transaction to the managing unit 13*a* and requests a determination as to whether the server 4 of the data provider is an authorized user of the cluster A (Step S33). The managing unit 13*a* performs authentication of the server 4 using the digital certificate that was input. Further, the managing unit 13*a* forwards the digital certificate of the server 4 to other communication devices 10 in the cluster A in order to perform an authentication process according to the blockchain technology and also requests an authentication process at each communication device 10. The management units 13 of the communication devices 10 in the cluster A other than the communication device 10*a* report the obtained authentication result to the managing unit 13*a*. Meanwhile, the forwarding of the digital certificate and the obtaining of the authentication result are executed by a blockchain application in order to realize the smart contract of the blockchain technology. Here, it is assumed that a certain proportion of the communication devices 10 in the cluster A succeeded in the authentication of the server 4. Then, the managing unit 13*a* determines that the authentication of the server 4 has been successful. In this case, according to the success in the authentication of the server 4, the managing unit 13 regards it as a formation of an agreement with respect to the provision of data from the server 4. The managing unit 13*a* reports the result of the determination to the controlling unit 12*a* (Step S34).

In accordance with the success of the authentication of the server 4, the controlling unit 12*a* starts a process for registering the metadata generated from information included in the metadata registration transaction received from the server 4. Hereinafter, the metadata generated from information included in the metadata registration transaction reported from the server 4 is assumed as metadata M11.

The controlling unit 12 generates the metadata M11 from information in the metadata registration transaction and stores it in the storing unit 20*a*. Further, the controlling unit 12*a* changes, in the information in the metadata, the access destination of data to the address of the communication device 10*a*, to generate the metadata M12. An example of the metadata M12 is presented in FIG. 10.

Figure 10:
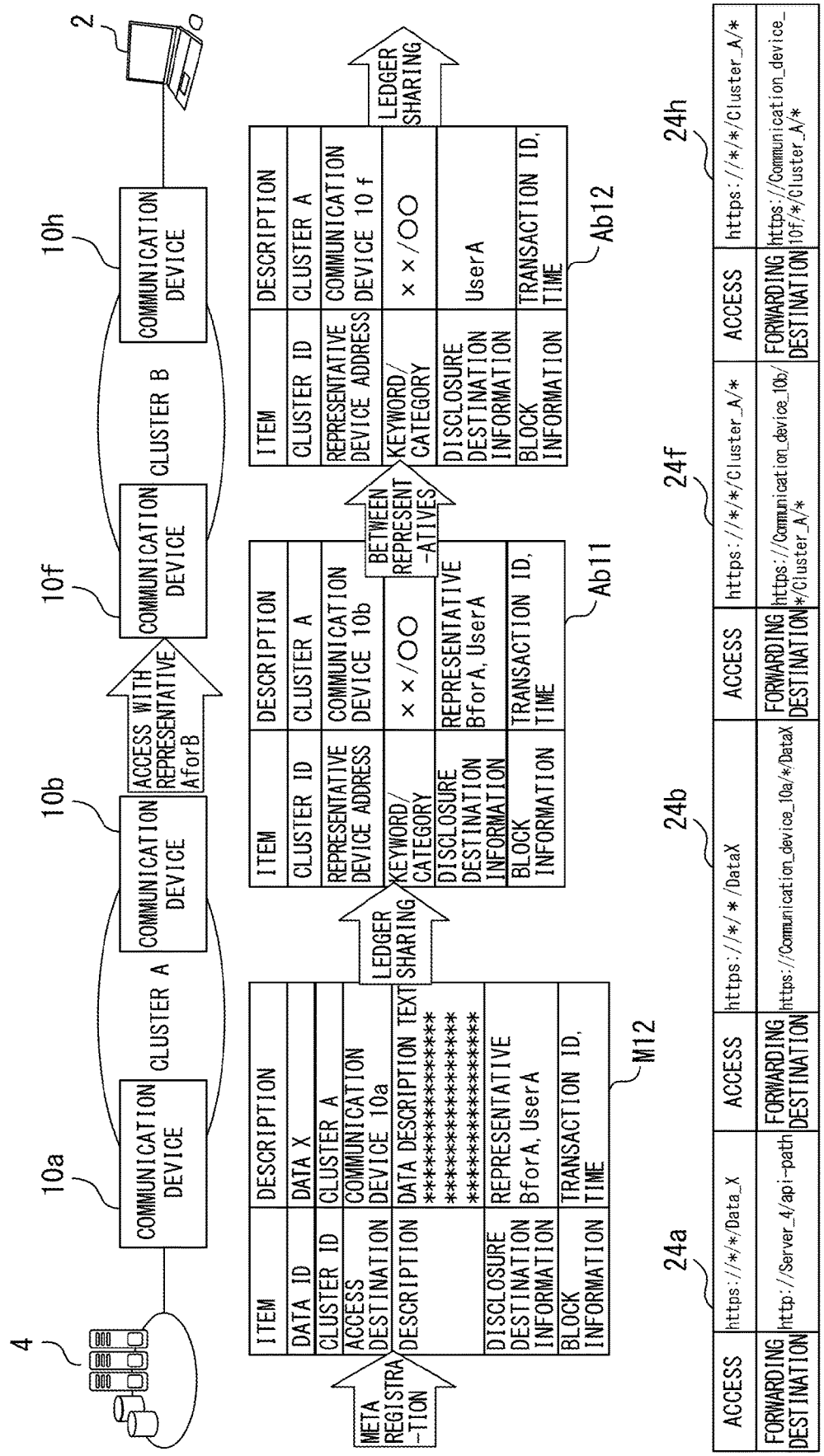
FIG. 10 is a diagram illustrating an example of a process for distributing metadata and a forwarding table.

FIG. 10 is a diagram illustrating an example of a process for distributing the metadata and the forwarding table 24. In the metadata M12, the address of the communication device 10*a* is recorded as the access destination together with information the data ID=Data X, the cluster ID=Cluster A. In addition, as disclosure destination information, Representative BforA and UserA are specified. Here, Representative BforA is an account assigned to the communication device 10f, and UserA is an account assigned to the terminal 2.

The managing unit 13a forwards the metadata M12 using the blockchain application to other communication devices 10 in the cluster A and has it stored in the storing unit 20 (FIG. 8, FIG. 9, Step S35). According to the process in Step S35, the distributed ledger in the blockchain technology in the cluster A is updated at each communication device 10 in the cluster A.

The controlling unit 12a updates the forwarding table 24a using the metadata M11 that has been stored in the storing unit 20a and sets the forwarding unit 11a so that the updated forwarding table 24a is used for the forwarding process (Step S36). When the setting is finished, the forwarding unit 11a transmits, to the server 4, a notification indicating that the metadata has been registered (Step S37).

The forwarding table 24a in FIG. 10 is an example of the forwarding table 24 set by the controlling unit 12a using the metadata M11. In the forwarding table 24a, the access-target data and information of the forwarding destination of the data retrieval transaction for requesting the retrieval of the data are associated, and the access-target data and the forwarding destination are both described as a URL (Uniform Resource Locator). The access-target data is specified, when the data ID=Data X, by https://*/*/Data X. In addition, the forwarding destination of the data retrieval transaction is specified as http://server_4/api-path. Meanwhile, Server 4 in the URL of the forwarding destination represents the address of the server 4.

Next, the processes at the communication device 10b that received the metadata are explained. The controlling unit 12b of the communication device 10b detects the distribution of the metadata M12 (FIG. 8, FIG. 9 in Step S38). The controlling unit 12b recognized that the data identified by the metadata M12 is disclosed to the devices that belong to the cluster B and that are identified by the accounts "Representative BforA", "UserA". The controlling unit 12b obtains, from the representative table 25b, the account, the password, the address of the representative device of the cluster B, and the like to be used when reporting the summary data generated from the metadata M12 to the representative device of the cluster B (Step S39).

Further, the controlling unit 12b records, in the forwarding table 24b, the forwarding destination of the data retrieval transaction forwarded from the representative device of the cluster B. In the forwarding table 24b after update (FIG. 10), when the access-target data is the data ID=Data X, the forwarding destination of the data retrieval transaction is specified as https:/Communication_device_10a/*/Data_X. The controlling unit 12b sets the forwarding unit 11b so that the forwarding table 24b is used for the forwarding process (FIG. 8, FIG. 9, Step S40).

The controlling unit 12b generates the summary data Ab11 from the metadata M12 (FIG. 10). In the summary data Ab11, the keyword, the disclosure destination information, and the like are included, together with information such as the cluster ID=Cluster A, the representative device address=the address of the communication device 10b. The controlling unit 12b controls the forwarding unit 11b and connects the communication device 10b to the communication device 10f that is the representative device in the cluster B. Further, the controlling unit 12b transmits the summary data Ab11 to the communication device 10f by controlling the forwarding unit 11b (FIG. 8, FIG. 9, Step S41). Meanwhile, it is assumed that, at this time, together with the summary data, the certificate data 23b used when the communication device 10b connects to the cluster B is also transmitted to the communication device 10f.

Upon receiving the summary data Ab11 and the certificate data 23b, the forwarding unit 11f in the communication device 10f forwards them to the controlling unit 12f (Step S42). The controlling unit 12f outputs the certificate data 23b to the managing unit 13f and requests a determination as to whether the communication device 10b is an authorized user of the cluster B (Step S43). The process performed in the determination as to whether the communication device 10b is authorized user of the cluster B is similar to the process that was explained with reference to Step S33. Upon being notified from the managing unit 13f that the communication device 10b has been determined as an authorized user, the controlling unit 12f generate summary data Ab12 (FIG. 10). The summary data Ab12 includes information the representative address=the address of the communication device 10f, the disclosure destination information=UserA. Information such as the keyword and the like is similar in the summary data Ab12 to that in the summary data Ab11. The managing unit 13f forwards the summary data Ab12 to other communication devices 10 in the cluster B using the blockchain application and makes it stored in the storing unit 20 (Step S45 in FIG. 8, FIG. 9).

The controlling unit 12f records, in the forwarding table 24f, the forwarding destination of the data retrieval transaction forwarded when the terminal 2 performs retrieval of data in the cluster A. In the forwarding table 24f after update (FIG. 10), data in the cluster A are represented as https:/*/*/Cluster_A/*. In addition, the forwarding destination of the data retrieval transaction is specified as https:/Communication device 10b/*/Cluster_A/*. The controlling unit 12f sets the forwarding unit 11f so that the forwarding table 24f is used for the forwarding process (FIG. 8, FIG. 9, Step S46). Further, the controlling unit 12f reports the completion of the registration of the summary data to the communication device 10b (Step S47).

The controlling unit 12h in the communication device 10h detects the distribution of the summary data Ab12 (Step S48). The controlling unit 12b records, in the forwarding table 24h, the forwarding destination of the data retrieval transaction with respect to data in the cluster A and also sets the forwarding unit 11h so that the forwarding table 24h after update is used (Step S49). In the forwarding table 24f after update (FIG. 10), the forwarding destination of the data retrieval transaction with respect to data in the cluster A (https:/*/*/Cluster A/*) is set as https:/the address of the communication device 10f/*/Cluster_A/*.

Meanwhile, the processes that were explained with reference to FIGS. 8 through 10 are examples. For example, the order of Step S35 and S36 may be changed, and the process of S40 may be performed before Step S39.

As described above, in the method according to the embodiment, each communication device 10 holds the summary data obtained by summarizing the metadata, with respect to data that may be retrieved from clusters to which the device itself does not belong. Accordingly, compared to the case in which each communication device 10 holds the metadata of data that may be retrieved from all the clusters, the amount of data held by each communication device 10 is smaller.

(2b) Process for Obtaining the Cluster List

Figure 11:
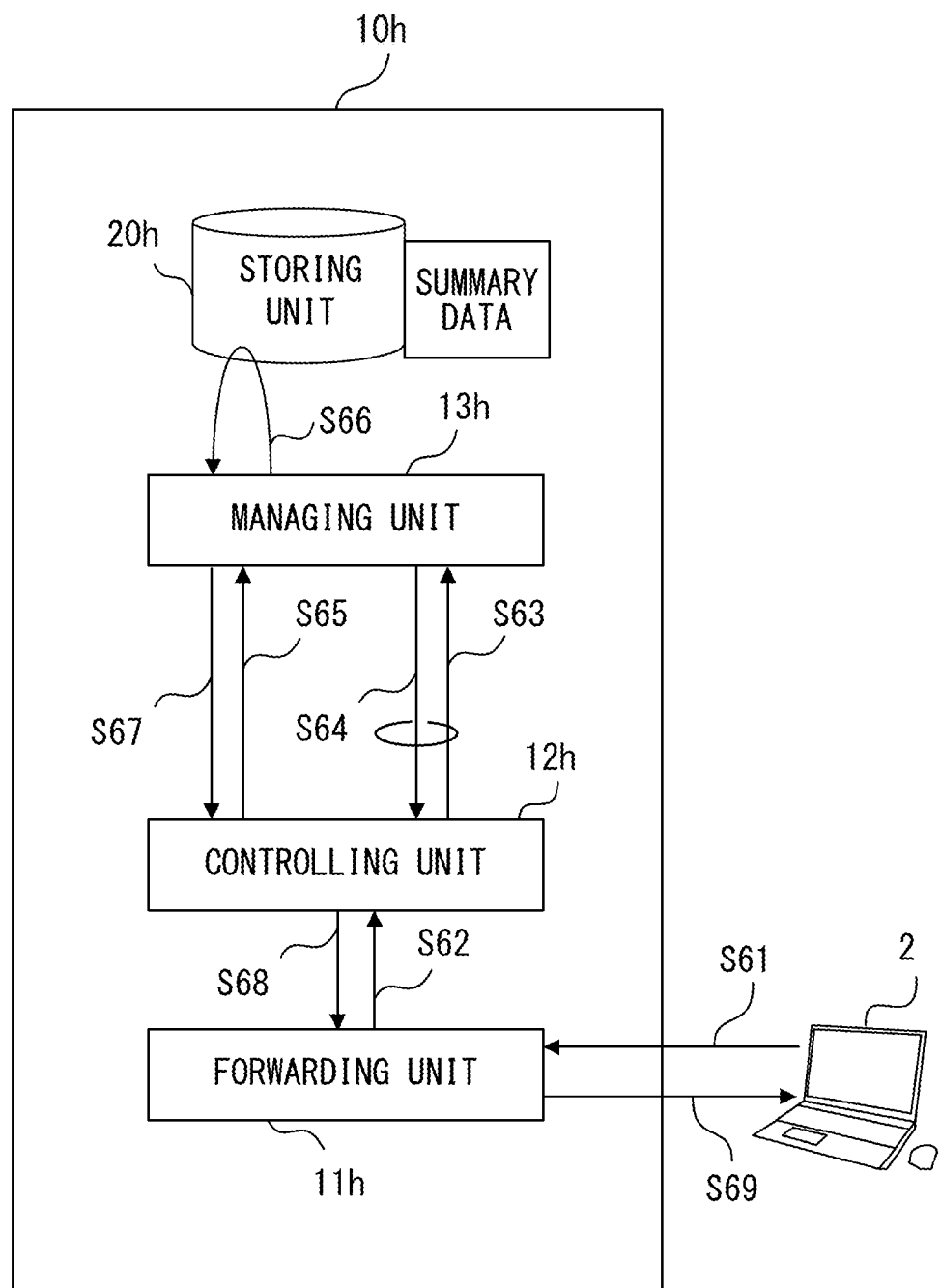
FIG. 11 is a diagram illustrating an example of a process for obtaining a cluster list.
Figure 12:
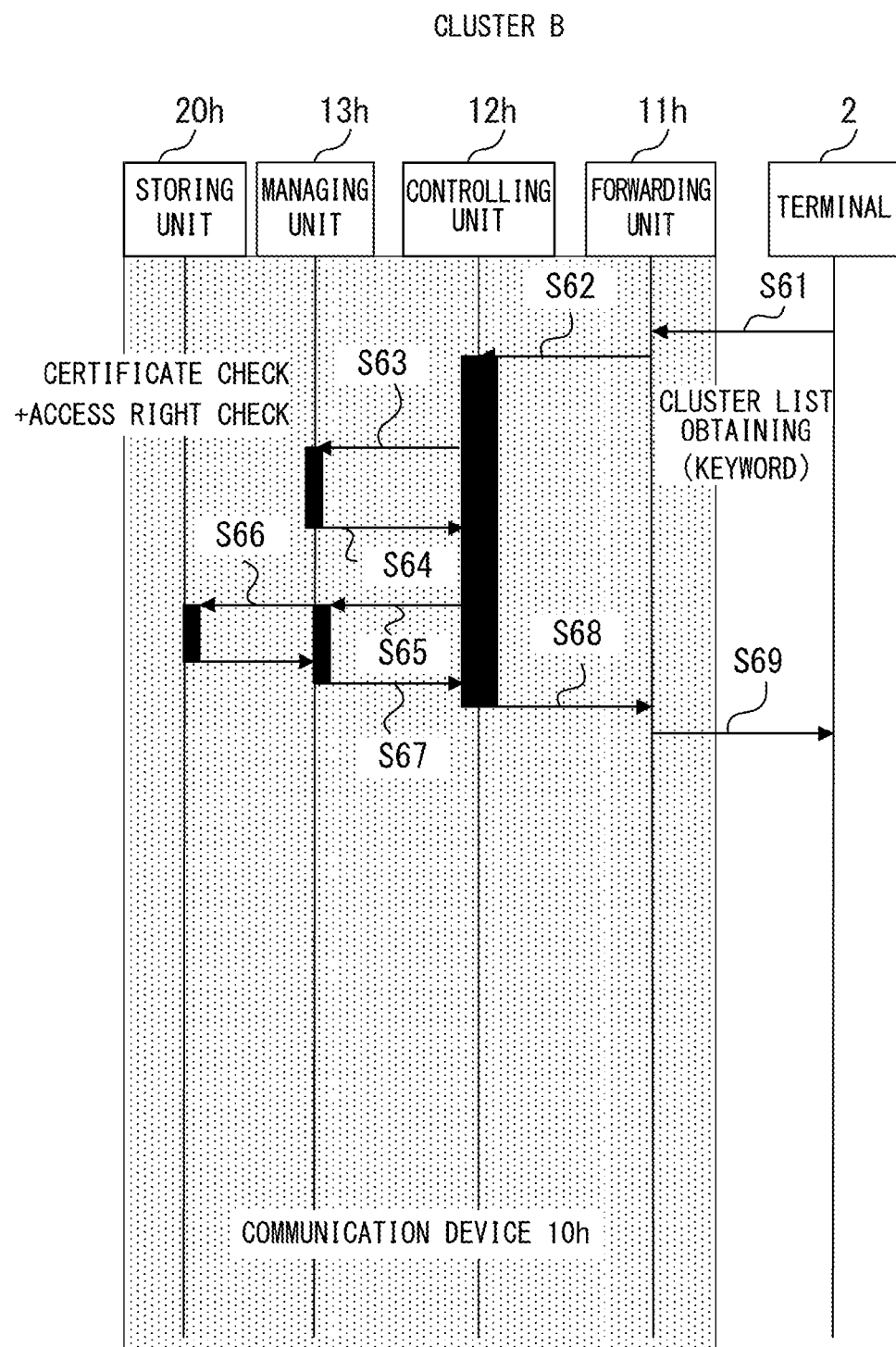
FIG. 12 is a sequence diagram illustrating an example of a process for obtaining a cluster list.

FIG. 11 is a diagram illustrating an example of the process for obtaining the cluster list. FIG. 12 is a sequence diagram illustrating an example of the process for obtaining the cluster list. Hereinafter, details of the process are explained with reference to FIG. 11 and FIG. 12.

The terminal 2 inquires the communication device 10h for identification information of the cluster that is other than the cluster B and is holding data that may be retrieved by the terminal 2, by transmitting the cluster list obtaining transaction to the communication device 10h (Step S61). Meanwhile, at this time, the terminal 2 also transmits, together with the cluster list obtaining transaction, the digital certificate that the terminal 2 has obtained for the connection to the cluster B.

Upon receiving the cluster list obtaining transaction and the digital certificate, the forwarding unit 11h in the communication device 10h forwards them to the controlling unit 12h (Step S62). The controlling unit 12h outputs, to the managing unit 13h, the digital certificate received together with the cluster list obtaining transaction and requests an authentication process (Step S63). The managing unit 13h performs authentication of the terminal 2 using the digital certificate that was input. The authentication process performed at the managing unit 13h is similar to the process explained with reference to Step S34 in FIG. 8, FIG. 9. Meanwhile, the authentication process performed at the managing unit 13h corresponds to a check as to whether the terminal 2 is an authorized user of the cluster B and a check of the access right to the summary data. When the issuing user ID is included in the disclosure destination information of the summary data including the cluster ID specified in the cluster list obtaining transaction, it is determined that the issuing source of the cluster list obtaining transaction has the access right to the summary data. When a certain proportion of the communication devices 10 in the cluster B succeed in the authentication process and further determine that the terminal 2 has the access right, the managing unit 13h reports the success of authentication to the controlling unit 12h (Step S64).

According to the success of authentication of the terminal 2, the controlling unit 12h requests the managing unit 13h to search for the summary data 22h that includes data that satisfies the search terms included in the cluster list obtaining transaction received from the terminal 2 and that is accessible by the terminal 2 (Step S65). At this time, the controlling unit 12h reports, to the managing unit 13h, as the search terms, information such as a keyword and/or information of the account of the terminal 2, and the like, included in the cluster list obtaining transaction. The managing unit 13h extracts, among the summary data 22h stored in the storing unit 20h, the summary data that includes the keyword and that is accessible by the terminal 2 (Step S66). At this time, the managing unit 13h searches, with the keyword being the key, the field of the keyword/category of the summary data. The managing unit 13h extracts, among the summary data that includes the keyword in the cluster list obtaining transaction, the summary data in which the user account assigned to the terminal 2 is included in the disclosure destination information. The managing unit 13h outputs the extracted summary data 22 to the controlling unit 12h (Step S67). The controlling unit 12h transmits the information obtained from the managing unit 13h to the terminal 2, via the forwarding unit 11h (Steps S68, S69). For example, as a response to the cluster list obtaining transaction, the summary data 22 that includes the ID of the cluster A and in which the account of the terminal 2 is included in the disclosure destination information may be transmitted to the terminal 2.

(2c) Process for Retrieving Metadata

Figure 13:
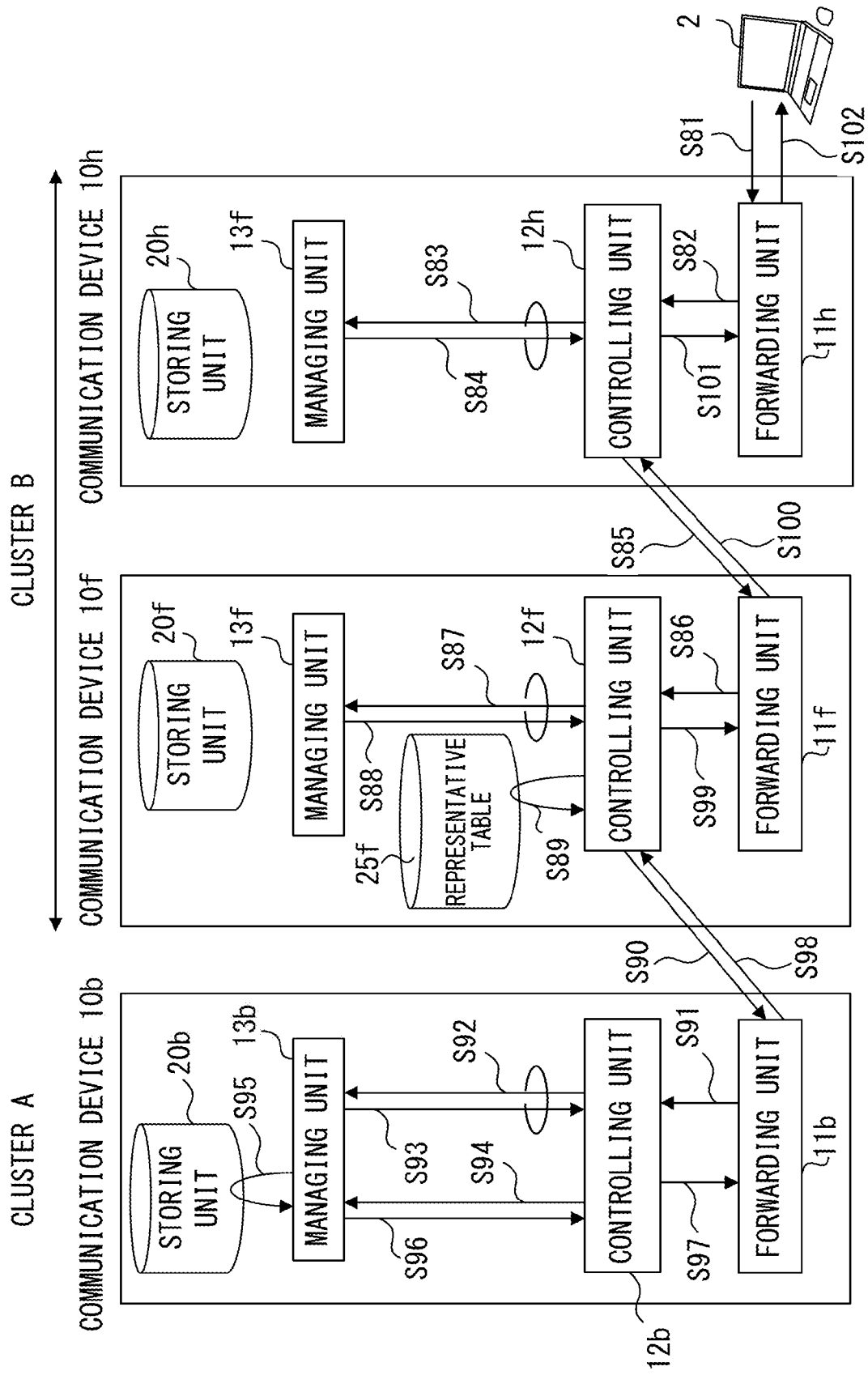
FIG. 13 is a diagram illustrating an example of a process for retrieving metadata.
Figure 14:
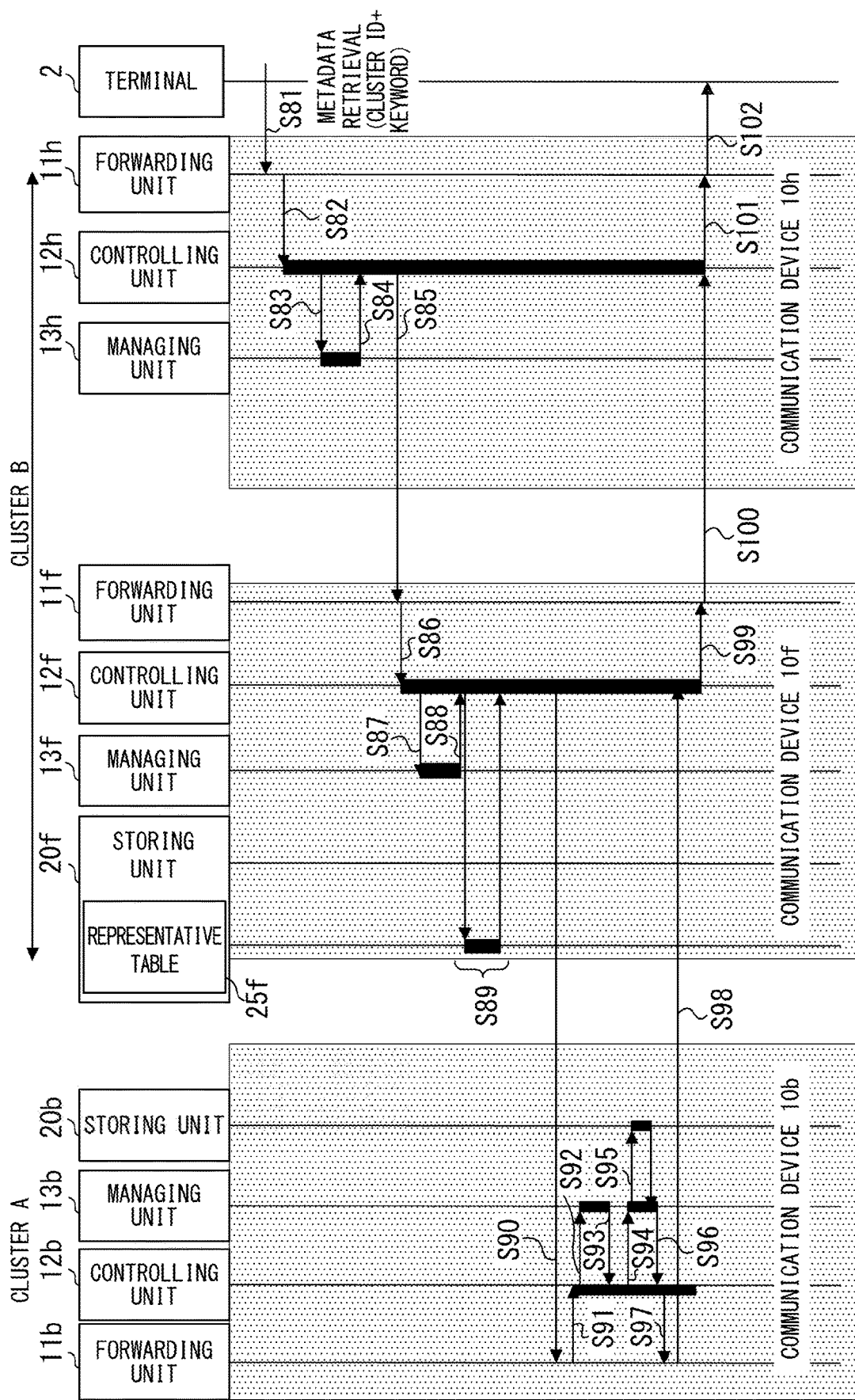
FIG. 14 is a sequence diagram illustrating an example of a process for retrieving metadata.

FIG. 13 is a diagram illustrating an example of the process for retrieving metadata. FIG. 14 a sequence diagram illustrating an example of the process for retrieving metadata.

Hereinafter, with reference to FIG. 13, FIG. 14, an example a case is explained in which the terminal 2 belonging to the cluster B obtains metadata of data that are retrievable from the cluster A.

It is assumed that the terminal 2 has recognized that there are retrievable data in the cluster A. Then, the terminal transmits a metadata retrieval transaction including following information to the communication device 10h (Step S81). It is assumed that UserA is an account assigned to the terminal 2.

Issuing user ID=UserA
Destination information=Communication device 10h
Cluster ID=Cluster A Meanwhile, at this time, the terminal 2 also transmits, together with the metadata retrieval transaction, the digital certificate that the terminal 2 has obtained for the connection to the cluster B.

Upon receiving the metadata retrieval transaction and the digital certificate, the forwarding unit 11h in the communication device 10h forwards them to the controlling unit 12h (Step S82). The processes performed in Steps S83 through S84 are similar to the processes that were explained with reference to Steps S63, S64 in FIG. 11. The authentication process performed at the managing unit 13h corresponds a check as to whether the terminal 2 is an authorized user of the cluster B and a check of the possession of the access right to the cluster that holds the metadata. Meanwhile, when the account of the issuing source is included in the disclosure destination information of the summary data including the cluster ID specified in the metadata retrieval transaction, it is determined that the issuing source of the metadata retrieval transaction has the access right to the metadata. Here, it is assumed that the terminal 2 has been determined to be an authorized user of the cluster B and has the access right to one of the metadata in the cluster A.

The controlling unit 12h forwards the metadata retrieval traction to the representative device (the communication device 10f) in the cluster B, because the cluster ID in the metadata retrieval transaction is not the ID of the cluster (the cluster B) to which the communication device 10h belongs (Step S85). At this time, the controlling unit 12h includes information of the communication device 10h in the forwarding source information of the metadata list obtaining transaction, and therefore, the following information is included in the metadata retrieval transaction.

Issuing user ID=UserA
Forwarding source information=Communication device 10h
Destination information=Communication device 10f
Cluster ID=Cluster A Further, it is assumed that the controlling unit 12h transmits, together with the metadata list obtaining transaction, the certificate data 23h that has been issued to the communication device 10h, to the representative device in the cluster B. Meanwhile, it is assumed that the communication device 10f being the representative device of the cluster B has been registered in the controlling unit 12h in advance.

The processes performed in Steps S86 through S88 when the communication device 10f receives the metadata retrieval transaction are similar to the processes that were explained with reference to Steps S82 through S84. Therefore, it follows that the check as to whether the terminal 2 has the access right to the metadata is to be performed both at the connection destination of the terminal 2 (the communication device 10h) and at the representative device (the communication device 10f).

When the authentication process has been successful, as the metadata is to be retrieved from the cluster A, the controlling unit 12f obtains conditions for the communication device 10f to access the cluster A, by referring to the representative table 25f (FIG. 4) (Step S89). Here, it is assumed that the controlling unit 12f recognizes, in accessing the cluster A, the address of the representative device of the access destination is IPB, the account of the communication device 10f in accessing the cluster A is "Representative B", and the password is "PW21". The controlling unit 12f forwards the metadata retrieval transaction including following information using the conditions obtained in Step S89, to the representative device (the communication device 10b) in the cluster A (Step S90).

Issuing user ID=UserA

Forwarding source information=Communication device 10f

Destination information=Communication device 10b

Cluster ID=Cluster A

The forwarding unit 11b of the communication device 10b receives the metadata retrieval transaction. The processes of Steps S91 through S93 performed when the communication device 10b receives the metadata retrieval transaction are similar to the processes that were explained with reference to Steps S82 through S84. In the authentication, whether the communication device 10f is an authorized user of the cluster A, whether there is metadata for which the access right is granted to the communication device 10f, and whether there is metadata for which the access right is granted to the terminal 2 are determined. Presence or absence of the access right is determined using the metadata. That is, when the communication device 10f is included in the disclosure destination information of the metadata, it is determined that the communication device 10f has the access right to that metadata. In a similar manner, it is determined that the terminal 2 also has the access right for the metadata in which the account of the terminal 2 is included.

The controlling unit 12b requests the managing unit 13b to retrieve the metadata that is accessible by the terminal 2 being the issuing source of the metadata retrieval transaction and that is associated with the keyword included in the search terms of the metadata retrieval transaction (Step S94). The managing unit 13b extracts, among the metadata 21b, the data that satisfies the terms reported from the controlling unit 12b, by referring to the storing unit 20b (Step S95). The managing unit 13b reports the obtained data to the controlling unit 12b (Step S96). The controlling unit 12b forwards the data obtained from the managing unit 13b to the communication device 10f via the forwarding unit 11b (Step S97, S98). At this time, the controlling unit 12b may decide the forwarding destination using the forwarding source information of the metadata retrieval transaction that the communication device 10b received.

The controlling unit 12f of the communication device 10f forwards the data received from the communication device 10b to the communication device 10h via the forwarding unit 11f (Step S99, S100). The controlling unit 12h of the communication device 10h forwards the data received from the communication device 10f to the terminal 2 via the forwarding unit 11f (Step S101, S102). Meanwhile at the communication device 10f, the communication device 10h, the forwarding destination of the response to the metadata retrieval transaction may also be decided using the forwarding source information of the metadata retrieval transaction that each device received. As a result, among the metadata generated in the cluster A, the data that is accessible from the terminal 2 and that is associated with the keyword in the metadata retrieval transaction transmitted from the terminal 2 is forwarded to the terminal 2.

(2d) Process for Retrieving Data

Figure 15:
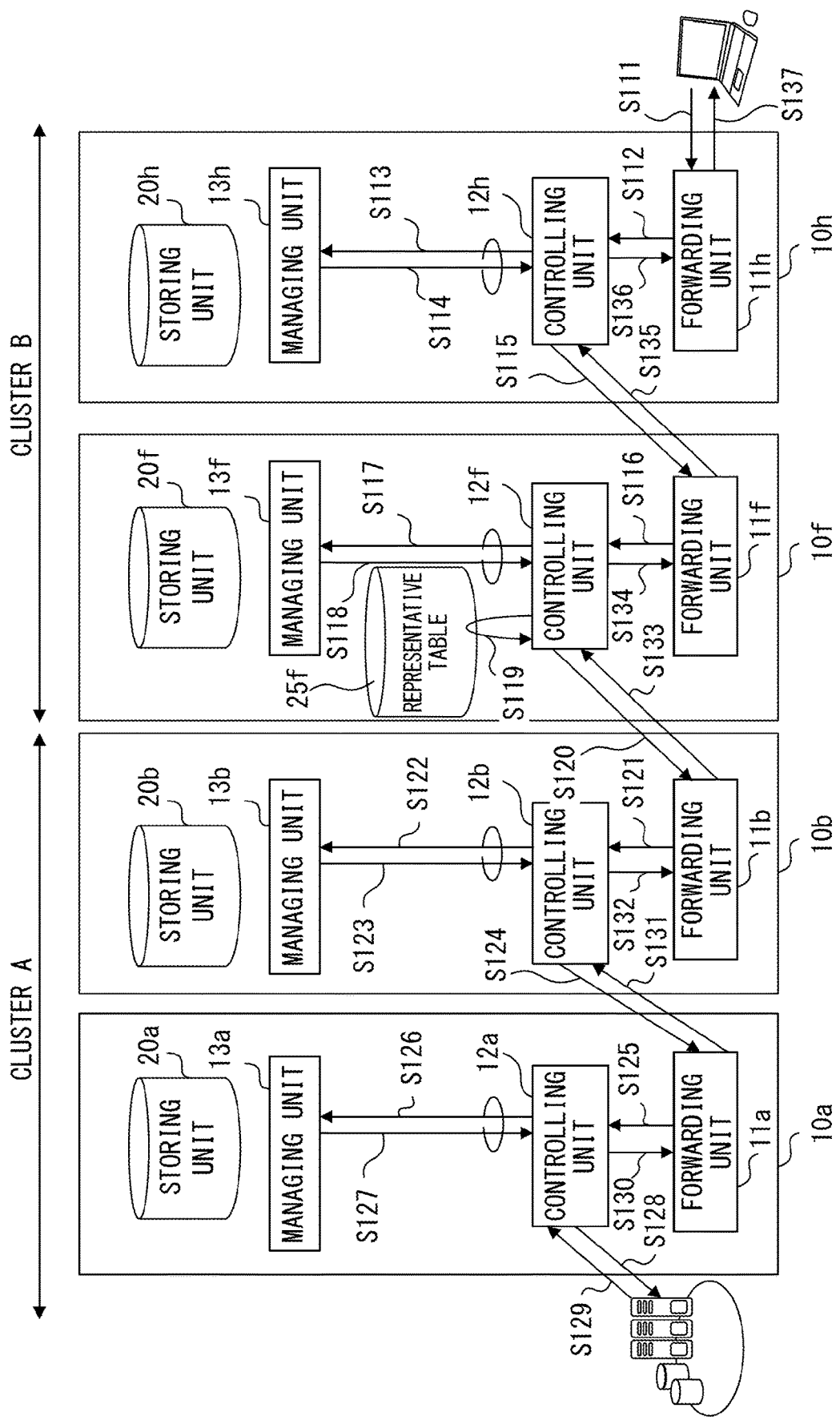
FIG. 15 is a diagram illustrating an example of a process for retrieving data.

FIG. 15 is a diagram illustrating an example of the process for retrieving data. FIG. 16 is a sequence diagram illustrating an example of the process for retrieving data. Hereinafter, an example of a case is explained in which the terminal 2 that belongs to the cluster B retrieves data identified by the data ID=Data X from the cluster A, with reference to FIG. 15 and FIG. 16.

It is assumed that the terminal 2 has recognized that, using the data obtained as the response to the metadata retrieval transaction, that there is data identified by the data ID=Data X in the cluster A. Then, the terminal 2 transmits, to the communication device 10h, the data retrieval transaction in which cluster ID=Cluster A, Data ID=Data X are set (Step S111). Meanwhile, at this time, the terminal 2 also transmits, together with the data retrieval transaction, the digital certificate that the terminal 2 has obtained for the connection to the cluster B.

Upon receiving the data retrieval transaction and the digital certificate, the forwarding unit 11h in the communication device 10h forwards them to the controlling unit 12h (Step S112). The processes performed in Steps S113 through S114 are similar to the process explained with reference to Step S63, S64 in FIG. 11. The authentication process performed at the managing unit 13h according to the reception of the data retrieval transaction corresponds to a check as to whether the terminal 2 is an authorized user of the cluster B and a check as to whether the terminal 2 has the access right to the cluster specified by the cluster ID. Meanwhile, the check of the access right to the cluster specified by the cluster ID is performed using the summary data.

The controlling unit 12h forwards the data retrieval transaction to the representative device in the cluster B, because the cluster ID of the data retrieval transaction is not the ID of the cluster (the cluster B) to which the local device belongs (Step S115). At this time, the controlling unit 12h adds information of the communication device 10h to the forwarding source information, and therefore, the following information is included in the data retrieval transaction.

Issuing user ID=UserA

Forwarding source information=Communication device 10h

Destination information=Communication device 10f

Cluster ID=Cluster A

Data ID=Data X

The controlling unit 12h transmits, together with the data retrieval transaction, the certificate data 23h that has been issued to the communication device 10h to the representative device (the communication device 10f) in the cluster B. The processes at Steps S116 through S118 performed when the communication device 10f receives the data retrieval transaction are similar to the processes that were explained with reference to the processes that were explained at Steps S112 through S114. Therefore, at the communication device 10f, a check as to whether the communication device 10h is an authorized user of the cluster B and a check as to whether or not the terminal 2 has the access right to the cluster specified by the terminal 2 are performed as the authentication process.

When the authentication process has been successful, as the data is to be retrieved from the cluster A, the controlling unit 12f obtains conditions for the communication device 10f to access the cluster A, by referring to the representative table 25f (FIG. 4) (Step S119). Here, it is assumed that the controlling unit 12*f* forwards the data retrieval transaction using the conditions obtained in Step S119, to the representative device (the communication device 10*b*) in the cluster A (Step S120). The forwarded data retrieval transaction includes the following information.

Issuing user ID=UserA
Forwarding source information=Communication device 10*f*
Destination information=Communication device 10*b*
the cluster ID=Cluster A
Data ID=Data X The forwarding unit 11*b* of the communication device 10*b* receives the data retrieval transaction. The processes performed in Steps S121 through S123 when the communication device 10*b* receives the data retrieval transaction are similar to the processes that were explained with reference to the Steps S112 through S114. The authentication performed at the managing unit 13*b* corresponds to a check as to whether the communication device 10*f* is an authorized user of the cluster A and a check as to whether both the communication device 10*f* and the issuing source (the terminal 2) of the data retrieval transaction have the access right to the data specified by the data ID. Here, as presented in the metadata M12 in FIG. 10, the permission for the access to the data whose ID=Data X is given to the device whose account is "Representative BforA" (the communication device 10*f*) and to the device "UserA" (the terminal 2), and therefore, the authorization is successful. When the authorization is successful, the controlling unit 12*b* identifies the access destination in retrieving the retrieval-target data, by searching the forwarding table 24*b* (FIG. 10) with the data ID=Data X being the key. In the example in FIG. 10, the data identified by Data X is represented as https://*/*/Data_X, and the access destination is https://Communication_device_10*a*/*/Data_X. Then, the controlling unit 12*b* forwards the data retrieval transaction including following information to the communication device 10*a* (Step S124).

Issuing user ID=UserA
Forwarding source information=Communication device 10*b*
Destination information=Communication device 10*a*
Cluster ID=Cluster A
Data ID=Data X The forwarding unit 11*a* of the communication device 10*a* receives the data retrieval transaction. The processes of Steps S125 through S127 performed when the communication device 10*a* receives the data retrieval transaction are similar to the processes that were explained with reference to Steps S121 through S123. When the authentication has been successful, the controlling unit 12*a* identifies the access destination in retrieving the retrieval-target data, by searching the forwarding table 24*a* (FIG. 10) with the data ID=Data X being the key. In the example in FIG. 10, the access destination associated with the data (https://*/*/Data X) identified by Data X is https://Server_4/*/api_path. The controlling unit 12*a* forwards the data retrieval transaction to the access destination specified in the forwarding table 24*a*, and therefore, the data retrieval transaction is forwarded to the server 4 (Step S128).

The server 4 transmits, in response to the data retrieval transaction, the requested data to the communication device 10*a* (Step S129).

The controlling unit 12*a* of the communication device 10*a* forwards the data received from the server 4 to the communication device 10*b* via the forwarding unit 11*a* (Step S130, S131). The controlling unit 12*b* of the communication device 10*b* forwards the data received from the communication device 10*a* to the communication device 10*f* via the forwarding unit 11*b* (Step S132, S133). The controlling unit 12*f* of the communication device 10*f* forwards the data received from the communication device 10*b* to the communication device 10*h* via the forwarding unit 11*f* (Step S134, S135). The controlling unit 12*h* of the communication device 10*h* forwards the data received from the communication device 10*f* to the terminal 2 via the forwarding unit 11*f* (Step S136, S137). As a result, the data requested by the terminal 2 is forwarded to the terminal 2. Meanwhile, the information of the forwarding source in the data retrieval transaction that each device received may also be used when forwarding the response to the data retrieval transaction.

As described above, in the communication according to the embodiment, the communication devices 10 in each cluster are able to provide, to the terminal 2, summary data and metadata with respect to data that are retrievable via a communication device 10 in a cluster to which the device itself does not belong. In addition, when the user of the terminal 2 attempts to retrieve summary data and/or metadata, a category and/or a keyword related to the information to be retrieved may be included as search terms. Accordingly, search results for summary data and/or metadata related to the category and/or the keyword specified by the user of the terminal 2 are to be provided to the terminal 2. Therefore, it becomes easier for the terminal 2 to understand the locations of data stored in devices belonging to different clusters, and the circulation of data across clusters is promoted.

Each communication device 10 holds, with respect to data that are retrievable from clusters to which the device itself does not belong, summary data instead of metadata. The summary data is smaller in size than the metadata, and moreover, a plurality of metadata may be put together in one summary data. Therefore, by using the summary data instead of the metadata, the amount of information held by the communication device 10 is reduced. Accordingly, the burden put on the communication device 10 becomes smaller.

In addition, communication between the clusters is performed by the representative devices, and the representative devices have been authenticated at each cluster, therefore, security of communication at each cluster is also secured. Furthermore, the determination with respect to the access right to data is performed for each cluster, and therefore, in a communication across clusters, the presence/absence of the access right is to be checked a plurality of times. For example, in the example illustrated in FIG. 15, FIG. 16, whether the terminal 2 has the access right is determined both at the cluster A and at the cluster B. Accordingly, even if one of the clusters makes a wrong determination due to a reason such as being subjected to a malignant attack, as long as the authentication at the other cluster is performed correctly, leakage of information may be prevented.

In the method according to the embodiment, whether the access permission is given to the terminal 2 that is going to retrieve data is checked using disclosure destination information in the metadata and the summary data, and therefore, the access policy for each data is observed. In addition, according to the blockchain technology, the access is permitted in the case in which a predetermined proportion or more of the communication devices 10 in the cluster succeeds in the authentication. In other words, data communication is performed in a manner linked with the success of authentication according to the blockchain technology. For this reason, even under a condition in which there is no administrator who manages all the sites and data, unauthorized accesses and alternation may be prevented. Therefore, data may be provided in a state in which the access policy for each data is observed and the authenticity of data is guaranteed.

<Others>

Meanwhile, the embodiment is not limited to the one described above and may be modified in various ways. Some examples are described below.

The information elements included in the metadata and the summary data described in the explanation above are an example and may be changed according to the implementation. For example, the data ID may be included in the summary data. In the case in which the data ID is included in the summary data, upon obtaining the summary data according to the cluster list obtaining transaction, the terminal is able to retrieve the retrieval-target data using the data ID and the cluster ID. Therefore, in the case in which the data ID is included in the summary data, compared to the case in which the data ID is not included in the summary data, the size of the summary data becomes large, but the process for retrieving the metadata does not have to be performed, and therefore, the communication process may be simplified.

In the summary data, information of a plurality of metadata may be put together as one, but one summary data may be generated for each metadata too. In the case in which one summary data is generated for each metadata, the trail management for data may be strengthened.

Information elements included in each transaction may be changed according to the implementation. For example, in a case in which the forwarding source and the issuing source of a transaction are the same, the forwarding source information may be omitted.

The communication device 10 that generated the summary data may be configured so as to transmit the summary data to the cluster that includes the disclosure destination but does not transmit the summary data to a cluster that does not include the device being the disclosure destination. For example, in the example in FIG. 10, the disclosure destination information in the summary data Ab11 specifies the device in the cluster B but does not specify the device in the cluster C. Therefore, even if the information of the summary data Ab11 is reported to the device belonging to the cluster C, there is no possibility that the summary data Ab11 is used for the retrieval of data. Then, the communication device 10b may omit transmission of the summary data Ab11 to the representative device of the cluster C. When a modification is made as described above, there is no need to hold the summary data that is not actually used for the retrieval of data, and the summary data does not have to be transmitted for a device that is not expected to use the summary data. Accordingly, the system becomes efficient.

As explained above, in the system according to the embodiment, the circulation of data across a plurality of networks is facilitated.

All examples and conditional language provided herein are intended for the pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A non-transitory computer-readable recording medium having stored therein a communication program that causes a computer, of a communication device belonging to a first cluster among clusters that include a plurality of communication devices, to execute a process comprising:
   storing a summary of metadata including attribute of data held by a terminal connected to a communication device belonging to another cluster that is different from the first cluster, the summary including, as the attribute, a word extracted from a description of the data, the description being included in the metadata;
   forwarding the summary to another communication device belonging to the first cluster;
   upon receiving a request to retrieve metadata based on the summary, retrieving the metadata from the communication device belonging to the another cluster and forwarding the retrieved metadata to a source that made the request to retrieve the metadata;
   receiving, from another terminal connected to the communication device belonging to the first cluster, an inquiry for a cluster that holds data retrievable by the another terminal;
   identifying, in the summary, information that the computer has determined to be associated with the data retrievable by the another terminal; and
   transmitting the identified information to the another terminal.

2. The non-transitory computer-readable recording medium according to claim 1, wherein
   the summary is forwarded to the another communication device of the first cluster by using a blockchain application.

3. The non-transitory computer-readable recording medium according to claim 1, wherein
   a data size of the summary is smaller than a data size of the metadata.

4. The non-transitory computer-readable recording medium according to claim 1, wherein the process further comprises:
   further storing a representative table including information identifying a device that is to be a connection destination in the another cluster when the communication device is set as a representative device that accesses the another cluster as a representative of devices belonging to the first cluster;
   generating another summary by summarizing another metadata upon receiving the another metadata with respect to data that may be provided to devices in the another cluster from a provider device connected to the communication device; and
   reporting the another summary to a device identified in the representative table.

5. The non-transitory computer-readable recording medium according to claim 4, wherein the process further comprises:
   obtaining, from another representative device identified in the representative table, a summary of metadata of data that is determined by the another representative device retrievable by a terminal connected to the communication device belonging to the first cluster; and
   forwarding the summary obtained from the another representative device to another communication device belonging to the first cluster.

6. A communication device belonging to a first cluster among clusters that include a plurality of communication devices, the communication device comprising:
- a memory configured to store a summary of metadata including attribute of data held by a terminal connected to a communication device belonging to another cluster that is different from the first cluster, the summary including, as the attribute, a word extracted from a description of the data, the description being included in the metadata; and
- a network connection device connected to a network which is the first cluster and configured to forward the summary to another communication device belonging to the first cluster, wherein
- the network connection device, upon receiving a request to retrieve metadata based on the summary, retrieves the metadata from the communication device belonging to the another cluster and forwards the retrieved metadata to a source that made the request to retrieve the metadata, and
- the network connection device
  - receives, from another terminal connected to the communication device belonging to the first cluster, an inquiry for a cluster that holds data retrievable by the another terminal,
  - identifies, in the summary, information that the communication device belonging to the first cluster has determined to be associated with the data retrievable by the another terminal, and
  - transmits the identified information to the another terminal.

7. A communication method for a communication device belonging to a first cluster among clusters including a plurality of communication devices, the method comprising:
- storing a summary of metadata including attribute of data held by a terminal connected to a communication device belonging to another cluster that is different from the first cluster, the summary including, as the attribute, a word extracted from a description of the data, the description being included in the metadata;
- forwarding the summary to another communication device belonging to the first cluster;
- upon receiving a request to retrieve metadata based on the summary, retrieving the metadata from the communication device belonging to the another cluster and forwarding the retrieved metadata to a source that made the request to retrieve the metadata;
- receiving, from another terminal connected to the communication device belonging to the first cluster, an inquiry for a cluster that holds data retrievable by the another terminal;
- identifying, in the summary, information that the communication device belonging to the first cluster has determined to be associated with the data retrievable by the another terminal; and
- transmitting the identified information to the another terminal.

* * * * *